United States Patent
Moore et al.

(10) Patent No.: US 7,397,867 B2
(45) Date of Patent: Jul. 8, 2008

(54) MAPPING RADIO-FREQUENCY SPECTRUM IN A COMMUNICATION SYSTEM

(75) Inventors: Steve Moore, Escondido, CA (US); John Santhoff, Carlsbad, CA (US)

(73) Assignee: Pulse-LINK, Inc., Carlsbad, CA (US)

( * ) Notice: Subject to any disclaimer, the term of this patent is extended or adjusted under 35 U.S.C. 154(b) by 0 days.

(21) Appl. No.: 10/932,969

(22) Filed: Sep. 2, 2004

(65) Prior Publication Data

US 2005/0031059 A1 Feb. 10, 2005

Related U.S. Application Data

(63) Continuation-in-part of application No. 09/802,603, filed on Mar. 9, 2001, now Pat. No. 6,937,674.

(60) Provisional application No. 60/255,469, filed on Dec. 14, 2000.

(51) Int. Cl.
*H03K 9/00* (2006.01)

(52) U.S. Cl. .................. 375/316; 375/316; 375/147

(58) Field of Classification Search ............ 375/316, 375/324, 340, 347, 147, 349; 342/147
See application file for complete search history.

(56) References Cited

U.S. PATENT DOCUMENTS

| | | | |
|---|---|---|---|
| 3,668,639 A | 6/1972 | Harmuth | |
| 3,678,204 A | 7/1972 | Harmuth | |
| 3,728,632 A | 4/1973 | Ross | |
| 4,045,616 A * | 8/1977 | Sloane | 704/203 |
| 4,169,245 A * | 9/1979 | Crom et al. | 455/132 |
| 4,201,892 A | 5/1980 | Schmidt | |
| 4,506,267 A | 3/1985 | Harmuth | |
| 4,586,177 A | 4/1986 | Kaul | |

(Continued)

FOREIGN PATENT DOCUMENTS

| | | |
|---|---|---|
| EP | 0 825 794 A2 | 2/1998 |
| WO | WO 98/27670 A1 | 6/1998 |

OTHER PUBLICATIONS

Yasaman Bahreini, John Santhoff, Kai Siwiak and Ismail Lakkis, Requirements for a UWB Common Signaling Protocol, Project: IEEE 802.15 Working Group for Wireless Personal Area Networks, Feb. 19, 2004, 9 pages, IEEE 802.15-04/079r1.

John Barr, TG3a Requirements Supporting a Common Base Mode, Project: IEEE 802.15 Working Group for Wireless Personal Area Networks, Feb. 19, 2004, 6 pages, IEEE 802.15-04/051r1.

(Continued)

*Primary Examiner*—Emmanuel Bayard

(57) ABSTRACT

Methods and systems for analyzing or mapping portions of the radio frequency spectrum are provided. In one embodiment of the invention, a communication method is provided, with a first step of the method including receiving an electromagnetic energy from a portion of a radio frequency spectrum. The received energy is then sampled in the time domain, and subsequently converted into the frequency domain. The sampled energy, that is now in the frequency domain is analyzed, and at least one communication parameter is selected based on the analysis of the sampled energy. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

11 Claims, 17 Drawing Sheets

U.S. PATENT DOCUMENTS

| | | |
|---|---|---|
| 4,641,317 A | 2/1987 | Fullerton |
| 4,651,152 A | 3/1987 | Harmuth |
| 4,743,906 A | 5/1988 | Fullerton |
| 4,813,057 A | 3/1989 | Fullerton |
| 4,979,186 A | 12/1990 | Fullerton |
| 5,134,408 A | 7/1992 | Harmuth |
| 5,148,174 A | 9/1992 | Harmuth |
| 5,153,595 A | 10/1992 | Harmuth |
| 5,159,343 A | 10/1992 | Harmuth |
| 5,253,202 A | 10/1993 | Bronner |
| 5,274,271 A | 12/1993 | McEwan |
| 5,307,079 A | 4/1994 | Ross et al. |
| 5,307,081 A | 4/1994 | Harmuth |
| 5,355,374 A | 10/1994 | Hester et al. |
| 5,363,108 A | 11/1994 | Fullerton |
| 5,365,240 A | 11/1994 | Harmuth |
| 5,493,691 A | 2/1996 | Barrett |
| 5,523,758 A | 6/1996 | Harmuth |
| 5,537,414 A | 7/1996 | Takiyasu et al. |
| 5,586,145 A | 12/1996 | Morgan et al. |
| 5,592,177 A | 1/1997 | Barrett |
| 5,610,907 A | 3/1997 | Barrett |
| 5,644,576 A | 7/1997 | Bauchot et al. |
| 5,677,927 A | 10/1997 | Fullerton et al. |
| 5,687,169 A | 11/1997 | Fullerton |
| 5,694,232 A | 12/1997 | Parsay et al. |
| 5,742,592 A | 4/1998 | Scholefield et al. |
| 5,790,551 A | 8/1998 | Chan |
| 5,815,537 A | 9/1998 | Jansenn |
| 5,832,035 A | 11/1998 | Fullerton |
| 5,901,172 A | 5/1999 | Fontana et al. |
| 5,909,469 A | 6/1999 | Frodigh et al. |
| 5,926,501 A | 7/1999 | Souissi et al. |
| 5,952,956 A | 9/1999 | Fullerton |
| 5,953,344 A | 9/1999 | Dail et al. |
| 6,014,374 A | 1/2000 | Paneth et al. |
| 6,031,862 A | 2/2000 | Fullerton et al. |
| 6,091,717 A | 7/2000 | Honkasalo et al. |
| 6,097,707 A | 8/2000 | Hodzic et al. |
| 6,178,217 B1 | 1/2001 | Defries et al. |
| 6,226,277 B1 | 5/2001 | Chauh |
| 6,226,504 B1 * | 5/2001 | Takagi ..................... 455/234.1 |
| 6,243,583 B1 | 6/2001 | Tsutsui et al. |
| 6,266,365 B1 * | 7/2001 | Wang et al. ................. 375/150 |
| 6,271,787 B1 * | 8/2001 | Springer et al. ............. 342/195 |
| 6,275,500 B1 | 8/2001 | Callaway et al. |
| 6,278,713 B1 | 8/2001 | Campbell et al. |
| 6,335,701 B1 * | 1/2002 | Fujisaka et al. ............. 342/115 |
| 6,414,492 B1 * | 7/2002 | Meyer et al. ................ 324/344 |
| 6,469,657 B1 * | 10/2002 | Fox ........................... 342/147 |
| 2001/0040525 A1 * | 11/2001 | Springer et al. ............. 342/195 |
| 2003/0067963 A1 * | 4/2003 | Miller et al. ................ 375/130 |
| 2004/0008617 A1 | 1/2004 | Dabak et al. |
| 2004/0228397 A1 * | 11/2004 | Bach ......................... 375/232 |

OTHER PUBLICATIONS

John McCorkle, Compromsing for UWB Interoperability—PHY Overview, Project: IEEE 802.15 Working Group for Wireless Personal Area Networks, Feb. 20, 2004, 5 pages, IEEE 802.15-04/081r0.

Michael Mc Laughlin, Options for a Common Signalling Protocol, Project: IEEE 802.15 Working Group for Wireless Personal Area Networks, Feb. 22, 2004, 6 pages, 15-04-0082-00-003a.

Federal Communications Commission, Revisions of Parts 2 and 15 of the Commission's Rules to Permit Unlicensed National Information Infrastructure (U-NII) devices in the 5 GHz band, Report and Order ET, Nov. 12, 2003, 62 pages.

California Microwave, Inc., California Microwave's Mrc Division Demonstrates Simultaneous Transmission Of High Definition And Standard Television Signals, Mar. 16, 1998, 1 p.

* cited by examiner

MAPPING RADIO-FREQUENCY SPECTRUM IN A COMMUNICATION SYSTEM

This application is a continuation-in-part of U.S. patent application Ser. No. 09/802,603, filed Mar. 9, 2001, now U.S. Pat. No. 6,937,674 entitled "MAPPING RADIO-FREQUENCY NOISE IN AN ULTRA-WIDEBAND COMMUNICATION SYSTEM", which claims priority to U.S. Provisional Application Ser. No. 60/255,469, filed Dec. 14, 2000, entitled "ULTRA WIDEBAND COMMUNICATIONS SYSTEM AND METHOD," both of which are incorporated herein by reference in their entirety.

FIELD OF THE INVENTION

The field of the present invention generally relates to impulse communication systems. More particularly, the invention concerns methods to map portions of the radio frequency (RF) spectrum and adapt communications in response to the noise, or other signals present in the mapped RF spectrum.

BACKGROUND OF THE INVENTION

Wireless communication systems are changing the way people work, entertain themselves, and communicate with each other. For example, the wide acceptance of mobile devices, such as the portable phone, has enabled great mobility while enabling easy voice and data communication with family, friends, and co-workers. As more features are added to these mobile wireless devices, users are able to receive a wider variety of information to facilitate enhanced entertainment and to more efficiently solve business problems. Data, such as computer files, graphics, video, and music may now be sent from a remote location and received at mobile wireless devices. Such wide area uses generally require a series of fixed transceivers arranged to communicate with the mobile wireless devices. In such a manner, the wireless device is enabled to communicate so long as the wireless device remains in contact with at least one of the fixed transceivers.

Not only is the use of such wide area systems expanding, but the use of local wireless communication systems is also growing. For example, wireless devices in a single building, such as a residence, may be configured to share information. Such local wireless communication systems may enable computers to control peripherals without physical connections, stereo components to communicate, and almost any appliance to have access to the Internet to send and receive information.

The amount of data being sent on both wide and local communication systems is mushrooming, and may quickly exceed the bandwidth available in the traditional communication bands. It has been recognized that a relatively new communication technology, "ultra-wideband" (UWB) may provide assistance in meeting the ever increasing bandwidth demands. For example, U.S. Pat. No. 6,031,862, entitled "Ultra-wideband Communication System and Method", discloses a communication system using an impulse radio system. Impulse radio is a form of UWB communication using individually pulsed monocycles emitted at intervals of many nanoseconds to fractions of nanosecond intervals to transmit a digital signal. A UWB communication system enables communication at a very high data rate, such as 100 megabit per second or greater.

Currently, with the vast amount of data being sent across local and wide area communication systems, radio frequency (RF) "noise" is impacting the reliability of data links. Unrelated UWB devices transmitting and receiving data independent and/or unaware of one another, in conjunction with natural or spurious man-made noise can create environments where signals "step" on one another (i.e., cancel one another out, amplify or interfere with one another). For example, UWB devices sending and receiving data unaware of one another might include instances where two or more UWB devices or a local home or office network are communicating in the same environment. Similarly, noise might be generated from a laptop computer, or other devices that can resonate, creating additional RF noise that can impact UWB communications.

Therefore, there exists a need for an ultra-wideband communication system that can operate reliably in today's noisy RF environment.

SUMMARY OF THE INVENTION

In order to overcome the deficiencies with known, conventional ultra-wideband communication systems, a method for mapping, or analyzing radio frequency (RF) noise is provided.

In one embodiment of the invention, a communication method is provided, with a first step of the method comprising receiving an electromagnetic energy from a portion of a radio frequency spectrum. The received energy is then sampled in the time domain, and subsequently converted into the frequency domain. The sampled energy, that is now in the frequency domain is analyzed, and at least one communication parameter is selected based on the analysis of the sampled energy.

Another method of the present invention includes listening to, or sampling a portion of the radio frequency spectrum. If appreciable RF noise is present in the sampled portion of spectrum, an ultra-wideband (UWB) communication device may generate and shape an UWB pulse stream that avoids that portion of the spectrum. One advantage of this embodiment is that it allows a UWB communication device to detect RF signals that may be sensitive to interference and then avoid transmitting within the detected RF band. Additionally, the UWB communication device may adapt its receiver to eliminate or suppress the noise present in an RF signal after it is received.

These and other features and advantages of the present invention will be appreciated from review of the following detailed description of the invention, along with the accompanying figures in which like reference numerals are used to describe the same, similar or corresponding parts in the several views of the drawings.

Figure 1:
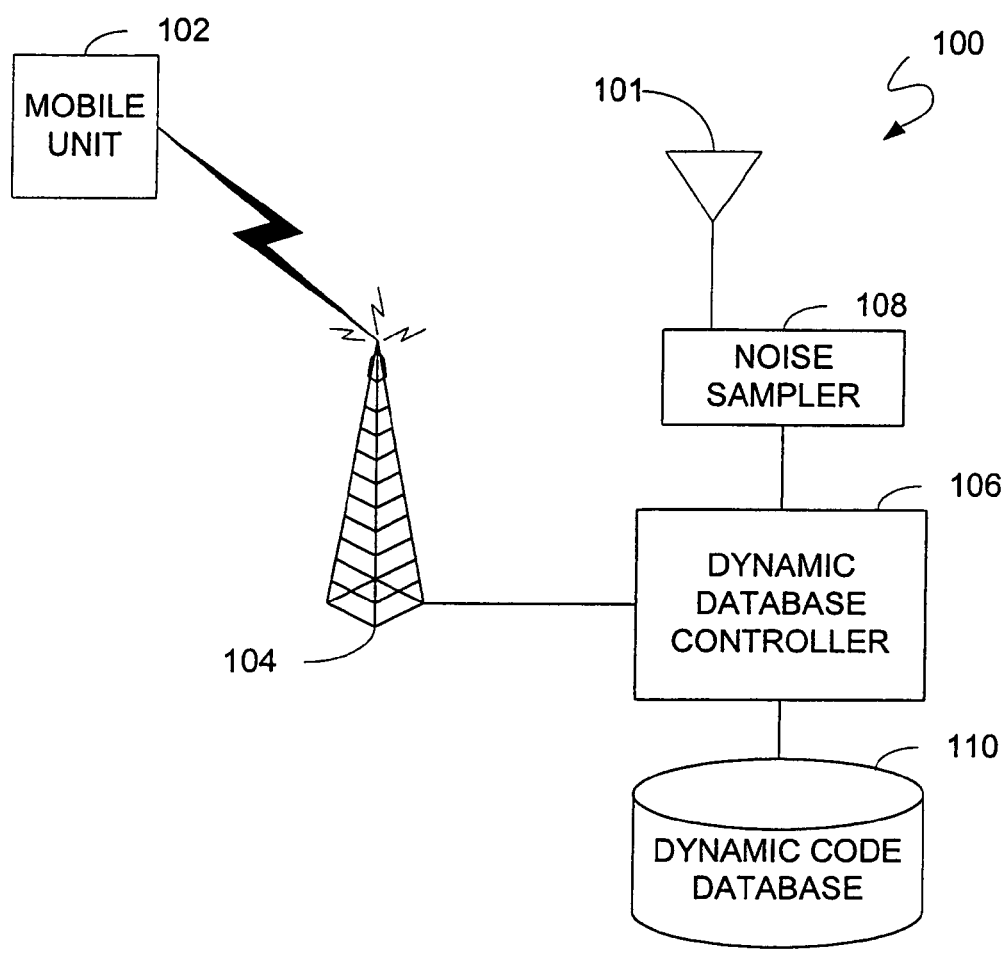
FIG. 1 is a schematic diagram of an exemplary ultra-wideband communication system capable of utilizing a multiple access scheme in accordance with an embodiment of the present invention.

It will be recognized that some or all of the figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

"Ultra-wideband" (UWB) is also known as "carrier-free", "baseband" or "impulse" technology. The basic concept is to develop, transmit and receive an extremely short duration burst of radio-frequency (RF) energy—typically a few tens of picoseconds (trillionths of a second) to a few hundred nanoseconds (billionths of a second) in duration. These bursts represent from one to only a few cycles of an RF carrier wave. The resultant waveforms are extremely broadband, so much so that it is often difficult to determine an actual RF center frequency—thus, the term "carrier-free".

In addition, because of the extremely short duration waveforms of UWB communications, packet burst and time division multiple access (TDMA), as well as code division multiple access (CDMA) protocols for multi-user communications can be implemented. However, implementation of TDMA and CDMA concepts into a UWB communication system requires novel methodologies and approaches.

Code Division Multiple Access (CDMA) is a digital spread-spectrum modulation technique that is transmitted over radio frequency waves and used mainly with personal communications devices such as mobile phones. It uses mathematical codes to transmit and distinguish between multiple wireless conversations. CDMA and CDMA-like methods can be used in a UWB communication system constructed according to the present invention to increase the number of users that can be supported from one or more base stations.

Attending the increase of the number of users is an increase of the amount of "noise" generated in the radio frequency (RF) spectrum. The vast amount of data being sent across communication systems creates a vast amount of RF noise, which impacts the reliability of data links. Unrelated UWB devices transmitting and receiving data independent and/or unaware of one another, in conjunction with natural or spurious manmade noise can create environments where signals "step" on one another (i.e., cancel one another out, amplify or interfere with one another).

For example, UWB channels sending and receiving data unaware of one another might include instances where one or more stand-alone UWB devices or a local home or office network are communicating in the same environment. Similarly, noise might be generated from a wide variety of devices from spark ignition engines to laptop computers. These, or other devices can forseeably be generating UWB pulse trains into channels already consumed by other UWB activity in the area. This potentially causes competition for bandwidth and/or pulse channels that may cause data errors. Inserting a UWB channel into this noise can reduce the quality of the channel, and reception of the UWB channel can be lost, as separating the noise from the timed pulses can become difficult.

The need to seek out and find a suitable unassigned channels increases proportionally as a function of increased number of users, increased channel capacity demands, and increased noise. In high-density, multi-user, high capacity consumption and/or noisy environments the availability of acceptable unassigned channels decreases. The resultant effect can mean greater demands on the system to search for suitable unassigned UWB channels.

To solve this problem, a UWB communication system may employ a plurality of distinct communication channels that may be managed and organized using the methods and devices described in U.S. patent application, Ser. No. 09/746,348, entitled: "Pretesting and Certification of Multiple Access Codes", filed Dec. 21, 2000, and U.S. patent application, Ser. No. 09/802,590, entitled "Encoding and Decoding Ultra-Wideband Information," filed Mar. 9, 2001, which are incorporated herein by reference in their entirety. One aspect of the above-identified invention will provide a method by which the system will pre-test, rank and assign UWB channels prior to any actual need for an unassigned channel. This will eliminate inefficiencies in channel allocation function and increase system efficiency. By constantly testing, analyzing, prioritizing and assigning a list of available channels, reliable and interference-free UWB communications will be realized.

The present invention discloses techniques used to digitally map and analyze the radio frequency (RF) noise floor specifically for UWB communications. Allocating channels effectively requires prior knowledge of the characteristics of the RF environment upon which the UWB channel will reside. By characterizing the noise that may be present in the time bins that are to be allocated to a channel, a determination can be made of possible interferences that will make that channel less than optimal for data transmission.

Referring to FIG. 1, a schematic diagram of an exemplary UWB communication system 100 capable of utilizing a multiple access scheme in accordance with one embodiment of the present invention is illustrated. One or more wireless mobile units 102 capable of UWB communication communicate with a UWB base station 104. The base station 104 may communicate directly with the dynamic database controller 106, or it may communicate with the radio-frequency (RF) noise sensing antenna 101. The dynamic database controller 106 communicates with the base station 104. The dynamic database controller 106 includes a general computing device for executing its functions and communicates with a noise sampler 108 and a dynamic code database 110.

Figure 2:
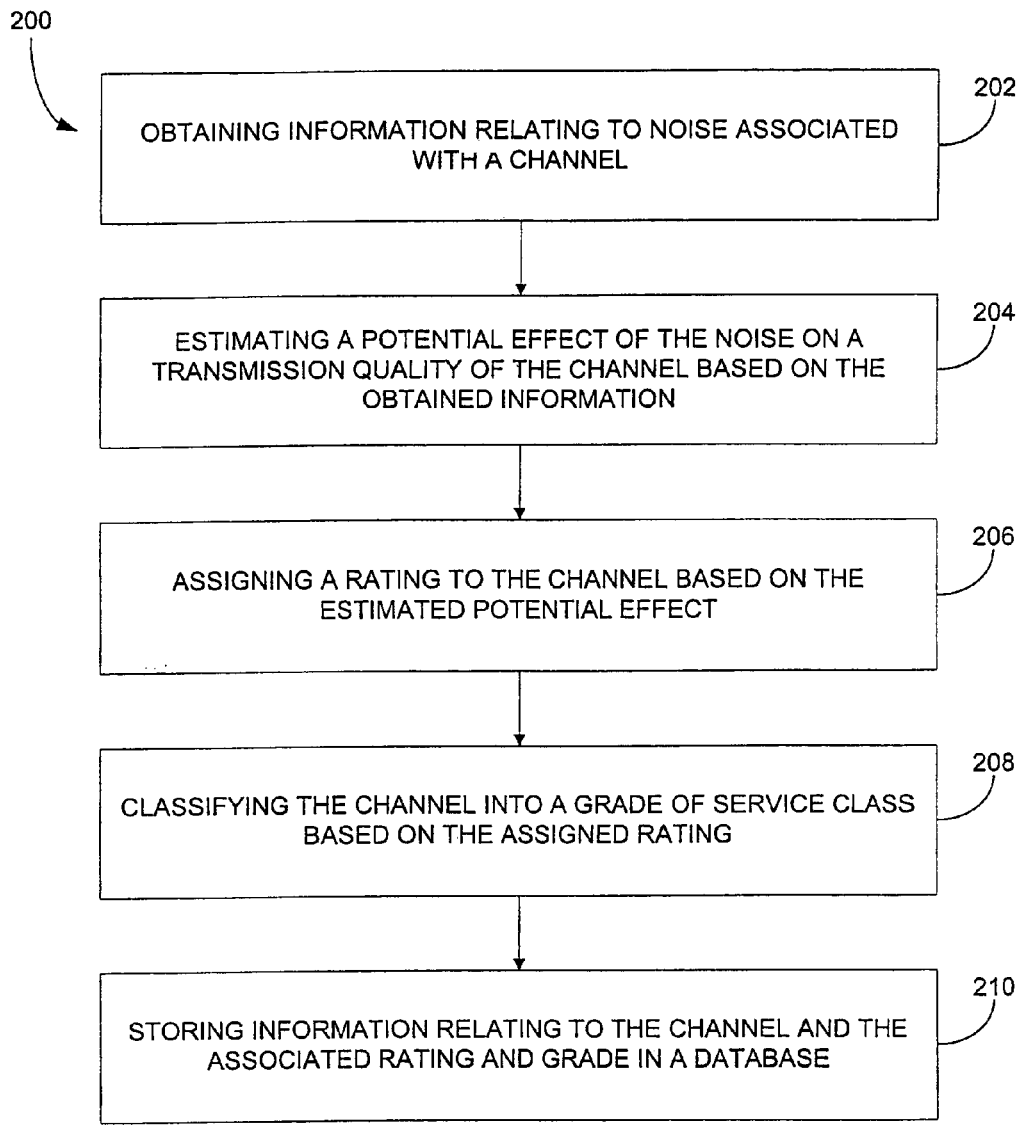
FIG. 2 is a flowchart of a process for managing the transmission suitability of a multiple access channel in a multi access scheme utilizing a dynamic database controller in a communication system such as an ultra-wideband communication system in accordance with an embodiment of the present invention.

FIG. 2 is a flowchart of a process 200 for managing the transmission suitability of a multiple access channel in a multi access scheme utilizing a dynamic database controller 106 in a UWB communication system in accordance with one embodiment of the present invention. It should be understood that the term "channel" used in the present invention may broadly refer to a multiple access scheme channel where multiple access may be achieved by codes, frequency, polarization, phase, etc. In general, information relating to channel noise associated with an unallocated channel is obtained utilizing the noise sampler 108 in operation 202. The noise sampler 108 may employ a RF noise sensing antenna 101. The dynamic database controller 106 then estimates a potential effect of the channel noise on a transmission quality of an unallocated channel based on the obtained information in operation 204. Next in operation 206, a rating is assigned by dynamic database controller 106 to the unallocated channel based on the estimated potential effect. Based on the assigned rating, the channel is classified into a grade of service class or classification in operation 208. Information relating to the now classified channel and its associated rating and grade of service class is then stored in the database 110 in operation 210.

Figure 3A:
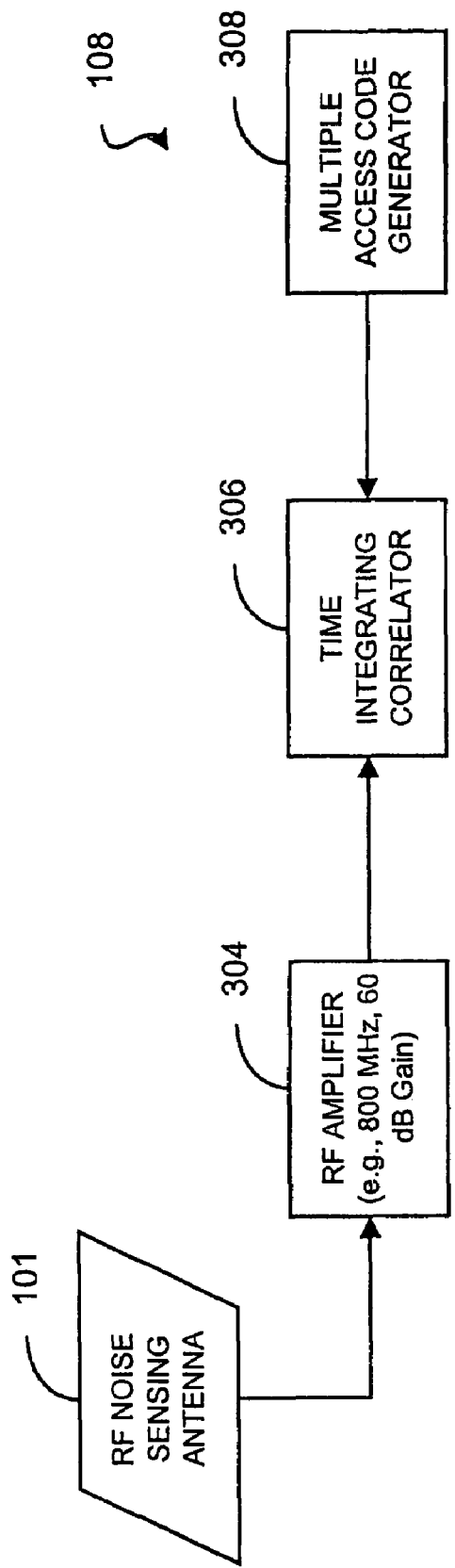
FIG. 3a is a schematic diagram of one embodiment of a RF noise sampler employing a time integrating correlator to correlate the RF noise signal with a UWB communication channel constructed in accordance with an embodiment of the present invention.

In one embodiment of the present invention, the information relating to RF noise associated with a specific channel may be obtained by sampling the RF noise and then correlating the RF noise with the channel. FIG. 3a is a schematic diagram of one embodiment of the noise sampler 108 illustrated in FIG. 1. In this embodiment, a time integrating correlator 306 correlates the RF noise signal with a code sequence. In particular, an RF noise sensing antenna 101 communicates with an RF amplifier 304 which communicates with a time integrating generator 306. The time integrating generator 306 also communicates with a multiple access code generator 308. This embodiment may be suitable for Code Division Multiple Access schemes. Time integrating correlators and code generators for these codes are known in the art. The RF noise samples for this approach may be detected either with the antenna used for data reception or by the dedicated RF noise-sensing antenna 101.

Figure 3B:
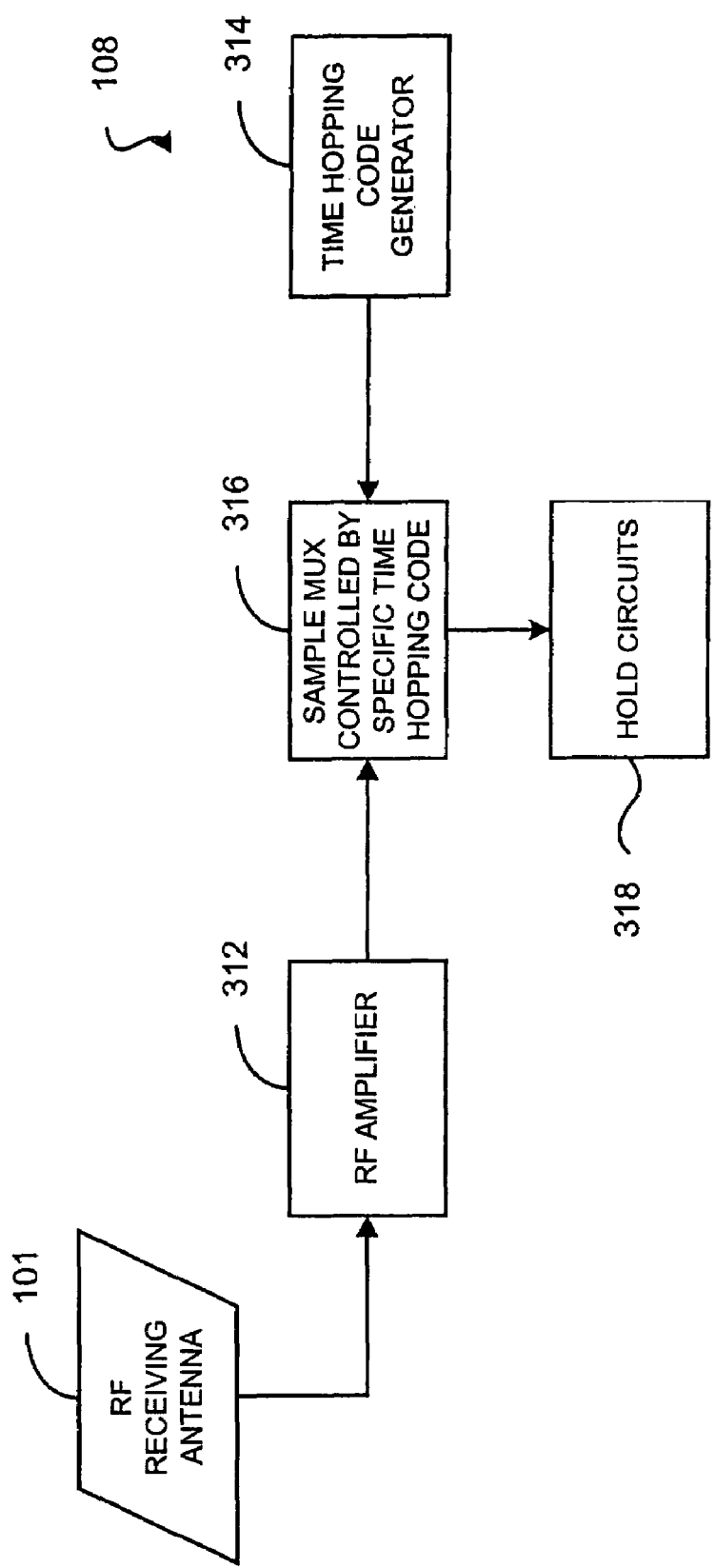
FIG. 3*b* is a schematic diagram of a RF noise sampler that utilizes real-time sampling of time bins in accordance with a preferred embodiment of the present invention.

FIG. 3b is a schematic diagram of a preferred embodiment noise sampler 108 that utilizes real-time sampling of time windows or "time bins". This noise sampler 108 is based on a different access scheme than the access scheme utilized in FIG. 3a. In particular, a RF receiving antenna 310 is coupled to a RF amplifier 312. The RF amplifier 312 and a Time Hopping code generator 314 are both coupled to a multiplexer (MUX) 316 which, in turn is coupled to Hold logic 318. In this noise sampler 108, a pseudo-random Time Hopping sequence is used together with a Time Division Multiple Access scheme (TH-TDMA). The RF noise sensing antenna 101 is used to sense the noise present in the time bins to be occupied by a particular unallocated Time Hopping sequence. In order to do this, the Time Hopping sequence is used to control the MUX 316 that allows the input samples to be held and digitized at the appropriate times matching the times that would be allocated to the Time Hopping sequence being tested.

Additional details of the UWB communication system illustrated in FIGS. 1-3b are more fully explained in U.S. patent application, Ser. No. 09/746,348, entitled "Pretesting and Certification of Multiple Access Codes".

Figure 4:
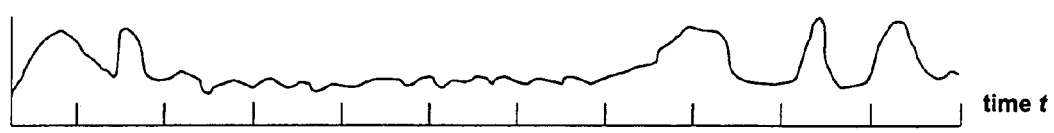
FIG. 4 illustrates a portion of sampled radio-frequency noise data.

FIG. 4 represents a frame of multiple-access data depicting amplitude (A) vs. time (t) and a hypothetical noise signature. In FIG. 4, 11 time bins $t_i$ are illustrated. In the following analysis, $f_j$ represents the frame number and $t_i$ represents a time bin within a frame. The index j runs from 0 to N and the index i runs from 0 to n. Time $f_0 t_0$ is the start of frame zero at time zero and is considered an absolute time and subsequent times are referenced relative to it. Time $f_{j+1} t_i - f_j t_i$ is the time period for one data frame. Time $f_j t_{i+1} - f_j t_i$ is considered one time bin. The duration of a time bin may vary from approximately 40 picoseconds to approximately 100 nanoseconds.

The following section describes a number of different embodiments of the present invention that analyze RF noise amplitudes with respect to time. A UWB communication channel constructed according to the present invention comprises a plurality of time bins $t_i$. All RF amplitude sampling of time bins $t_i$ for the following methods can be performed at time, $$\frac{t_i + t_{i+1}}{2}$$

or in other words, the center of the time bin. Other suitable sampling methods can also be performed to obtain a sample of RF noise. Obtaining and analyzing RF noise samples may be performed by a programmable general computing device programmed to perform the described operations. This analysis may be performed by the dynamic database controller 106, the dynamic code database 110, or another suitable device.

The following data sample matrix S represents one sample set of collected RF noise data, each row is one frame of data and each column represents the same time bin $t_i$ in each frame. If N+1 frames are sampled with n time bins in each frame, then the stored matrix is as depicted in S. $A(f_j t_n)$ is the amplitude detected in the center of the last time bin $t_n$ frame $f_j$:

$$S = \begin{bmatrix} A(f_0 t_0) & A(f_0 t_1) & \cdots & A(f_0 t_n) \\ A(f_1 t_0) & A(f_1 t_1) & \cdots & A(f_1 t_n) \\ \vdots & \vdots & & \\ A(f_{N-1} t_0) & A(f_{N-1} t_1) & \cdots & A(f_{N-1} t_n) \\ A(f_N t_0) & A(f_N t_1) & \cdots & A(f_N t_n) \end{bmatrix}$$

The RF noise data samples will probably contain data from other ultra-wideband devices or other types of noise. For example, impulsive noise such as automobile ignition systems that produce random bursts of nanosecond pulses or other ultra-wideband time pulses may be present. The following embodiments of the present invention analyze RF noise with respect to time to determine the amount and nature of noise present in selected channels. Once the noise in each channel is determined, the channels are ranked based on the amount and type of noise present.

Random noise, also known as additive white Gaussian noise, can be removed through known techniques and a UWB communication channel can be inserted over additive white Gaussian noise. However, RF noise that is systematically increasing or decreasing cannot be removed and will decrease the reliability or otherwise interfere with a UWB channel placed over that noise.

By sampling RF noise data and obtaining the absolute value of the differences between selected data, the nature of the noise can be determined. The absolute value of the difference of selected RF noise data samples can show whether or not the noise is increasing or decreasing. In addition, different embodiments of the invention described below will also determine the average of the noise, the change in the RF noise from one time bin $t_i$ to another time bin $t_i$ and the rate of change of two selected RF noise data samples.

Figure 5:
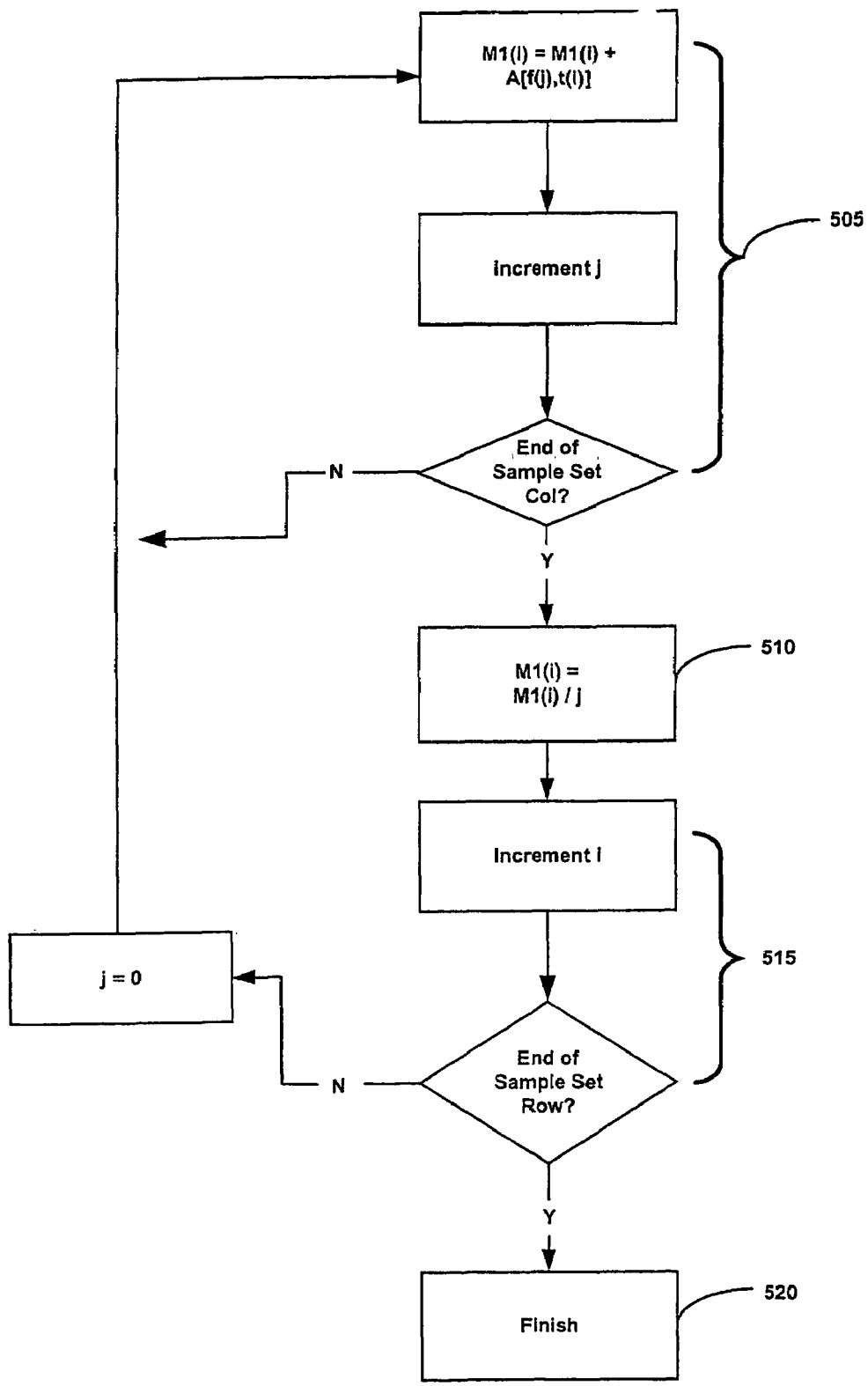
FIG. 5 is a schematic diagram of one method for analyzing RF noise in accordance with one embodiment of the present invention.

Referring to FIG. 5, a sample average of the same time bins $t_i$ over multiple frames $f_j$ of a UWB communication channel constructed according to the present invention will be described. The sample averaging of the same time bins $t_i$ over multiple frames $f_j$ is expressed by the following equation (1):

$$\overline{M1}_i = \frac{1}{N+1} \sum_{j=0}^{N} A(f_j t_i) \quad (1)$$

This equation takes a column-wise average, which produces a vector of averages $\overline{M1}_i$. Taking column-wise averages produces a vector of averages where $A(f_j t_i$ is equal to the sampled amplitude for a time bin, a pulse slot at time i, in frame j. The number of sample frames is N+1. As shown in FIG. 5, a flowchart illustrates some of the steps a program will perform to analyze the sampled RF noise data. A UWB communication system constructed according to the present invention will employ one or more programs to perform the analysis now discussed. The above equation is performed on matrix S which contains RF noise data samples. In step 505, the RF noise amplitude found in the same time bin $t_i$ in each frame $f_j$ is summed. In step 510, that sum of RF noise amplitudes is averaged. In step 515, the program moves to the next column representing a second time bin $t_{i+1}$. The sum for the second column is then averaged in step 510, and this process of summing each column representing a distinct time bin $t_i$ is repeated until all of the time bins $t_i$ in all of the frames $f_j$ have been summed and averaged, finishing at step 520.

The resultant average for each time bin $t_i$ represents the average RF noise amplitude for that specific time period. After step 520, the RF noise amplitudes for adjacent time periods can then be evaluated to detect if a periodic signal with a main periodicity of one frame $f_j$ is present. If periodic noise is present, an estimation of the effect of the noise on the transmission quality is performed by the dynamic database controller 106, illustrated in FIG. 2.

Figure 6:
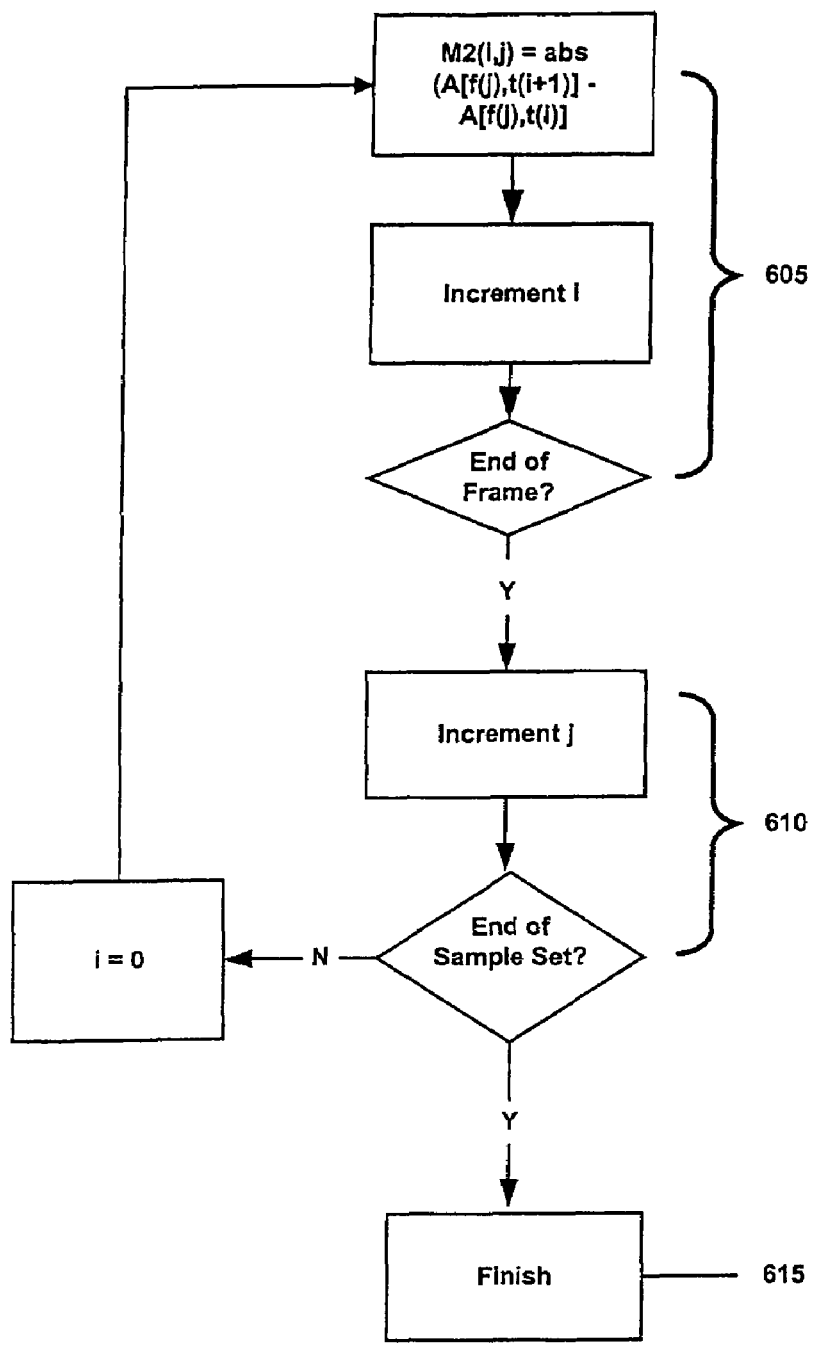
FIG. 6 is a schematic diagram of another process for analyzing RF noise in accordance with another embodiment of the present invention.

Referring to FIG. 6, another process according to the present invention is illustrated which evaluates the RF noise amplitude data. The process illustrated in FIG. 6 takes a first difference of adjacent time bins $t_i$ within a frame $f_j$. This is expressed by the following equation (2):

$$M2_{ij} = |A(f_j t_{i+1}) - A(f_j t_i)|. \quad (2)$$

In step 605, the difference of the amplitudes of RF noise samples in adjacent time bins $t_i$ in the same frame $f_j$ is taken. This process is repeated in step 605 until all of the adjacent time bins $t_i$ in one frame $f_j$ have been evaluated. In step 610, when the end of the frame is reached, the next frame $f_{j+1}$ is analyzed according to step 605. In this manner, all of the adjacent time bins $t_i$ in a plurality of frames $f_j$ are evaluated. This first difference calculation $M2_{ij}$ obtains the difference in RF noise amplitudes in adjacent time bins $t_i$ within a frame $f_j$. At step 615, when all of the RF noise samples have been analyzed, this information can be used to determine if the RF noise is increasing or decreasing with time by the dynamic database controller 106.

Alternatively, the data obtained by equation (1) can be used to obtain the absolute value of a difference of adjacent time bin $t_i$ RF noise amplitude averages. This process is expressed by the following equation (3):

$$\overline{M2}_i = |\overline{M1}_{i+1} - \overline{M1}_i|. \quad (3)$$

In equation (3), an absolute value of the difference between averaged RF noise samples in adjacent time bins $t_i$ is obtained. The data obtained after this analysis will be used by the dynamic database controller 106, or other suitable device to determine the change in RF noise amplitudes in adjacent time bins $t_i$.

Figure 7:
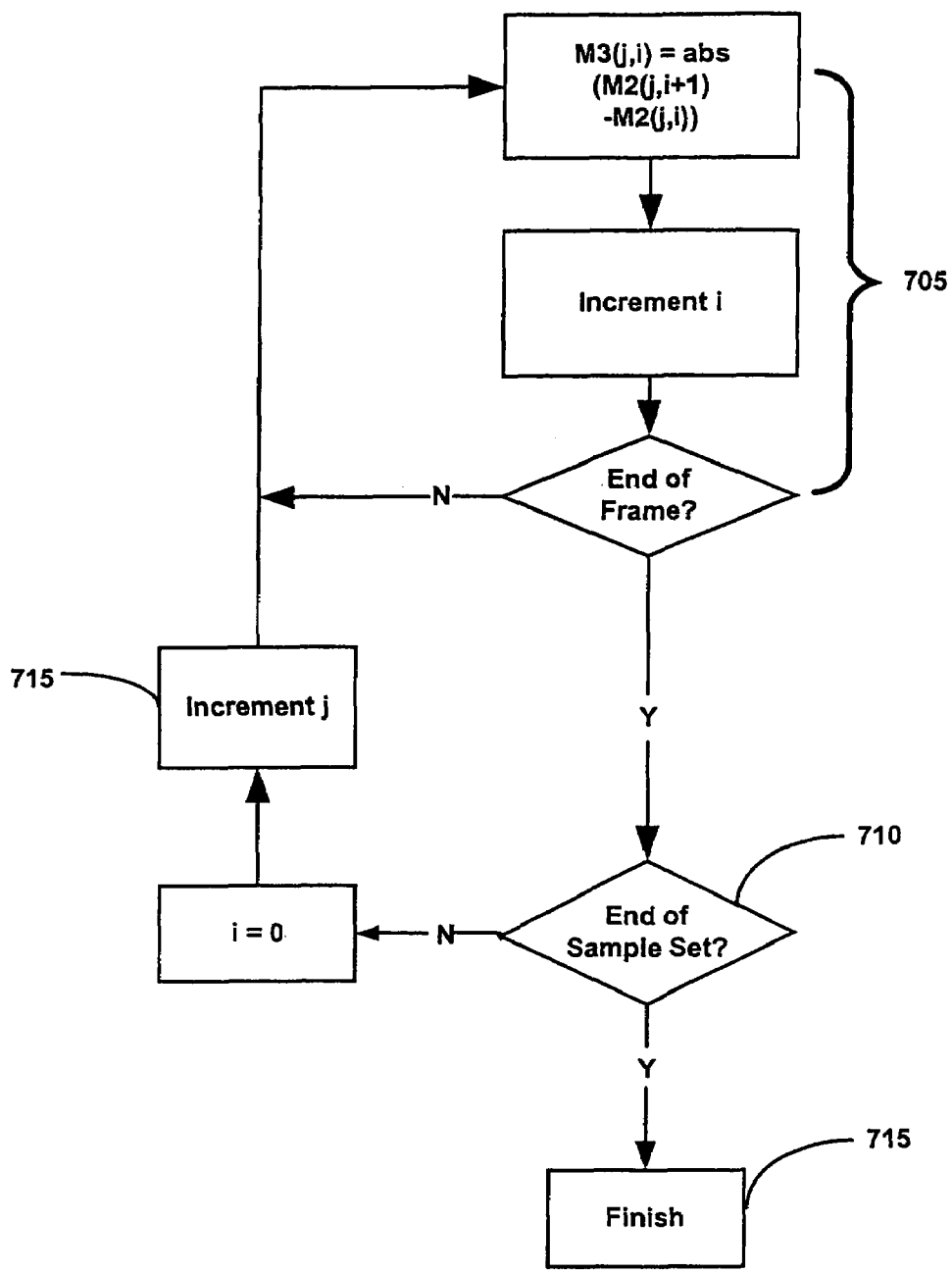
FIG. 7 is a schematic diagram of another method for analyzing RF noise in accordance with another embodiment of the present invention.

Referring to FIG. 7, a process to obtain a second difference of adjacent time bins $t_i$ is illustrated. This process uses the data obtained from equation (2). The process illustrated in FIG. 7 takes a second difference of adjacent time bins $t_i$ within a frame $f_j$. This is expressed by the following equation (4):

$$M3_{ij} = |M2_{i+1} - M2_i| \quad (4)$$

In step 705, the absolute value of the difference of the change in adjacent time bins $t_i$ in the same frame $f_j$ is obtained. This process is repeated in step 705 until all of the adjacent time bins $t_i$ in one frame $f_j$ have been evaluated. In step 710, when the end of the frame is reached, the next frame $f_j$ is analyzed according to step 70, by incrementing to the next frame $f_j$ in step 715. This process is repeated until all of the differences of the same time bins $t_i$ are obtained for all frames $f_j$. In this manner, all of the adjacent time bins $t_i$ and a plurality of frames $f_j$ are evaluated. This second difference calculation $M3_{ij}$ obtains the second difference of RF noise amplitudes of adjacent time bins $t_i$ within a frame $f_j$. At step 720, when all of the RF noise samples have been analyzed, this information can be used to determine the rate of change of the RF noise by the dynamic database controller 106, or other suitable devices. The rate of change of the RF noise can help to determine the quality of a channel and can also be used to estimate a potential effect of the noise on a transmission.

Alternatively, the data obtained by equation (3) can be used to obtain the absolute value of a second difference of adjacent time bin $t_i$ RF noise amplitude averages. This process is expressed in the following equation (5):

$$\overline{M3_i} = |\overline{M2_{i+1}} - \overline{M2_i}|. \tag{5}$$

In equation (5), an absolute value of the second difference between averaged RF noise samples in adjacent time bins $t_i$ is obtained. This data is used by the dynamic database controller 106, or other suitable device to determine the rate of change, or how fast the RF noise amplitudes in adjacent time bins $t_i$ is changing.

Figure 8:
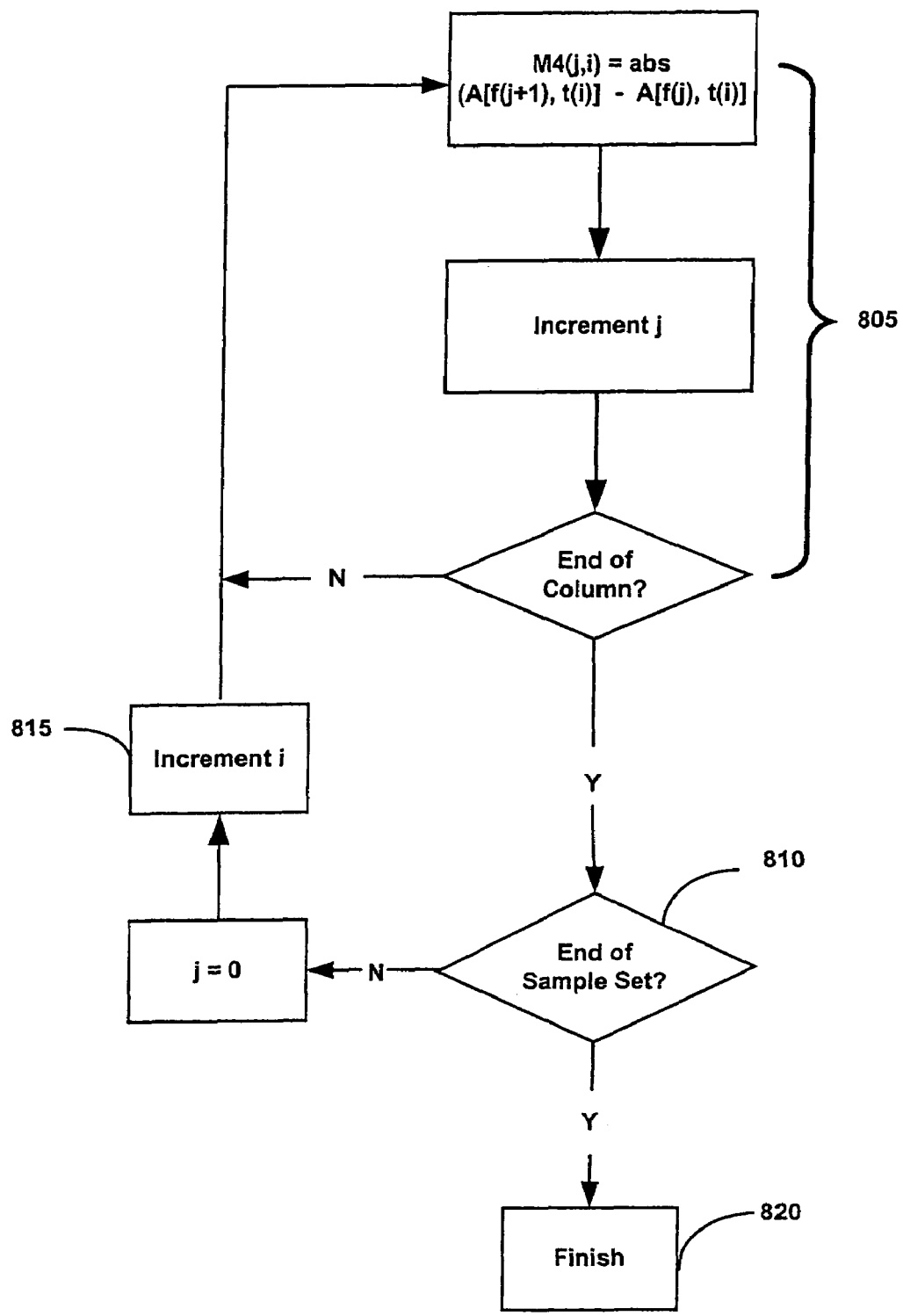
FIG. 8 is a schematic diagram of another method for analyzing RF noise in accordance with another embodiment of the present invention.

Referring to FIG. 8, an alternative process for evaluating the RF noise amplitude in a data sample for use in an UWB communication system constructed according to the present invention is illustrated. Referring to FIG. 8, a first difference of the same time bins $t_i$ over multiple frames $f_j$ is obtained. This is expressed by the following equation (6):

$$M4_{ji} = |A(f_{j+1}t_i) - A(f_jt_i)|. \tag{6}$$

This process uses sampled RF amplitude data from two consecutive frames $f_j$ contained in the matrix S defined above. This is illustrated in step 805 of FIG. 8 where the absolute value of the difference between the same time bin $t_i$ in adjacent frames $f_j$ is calculated. In step 810, the difference of adjacent time bins $t_i$ is repeated until all of the frames $f_j$ have been evaluated. When the last frame $f_j$ has been evaluated, the program continues by moving to the next time bin $t_i$ in step 815. In this manner, all time bins $t_i$ in a sample of RF noise amplitude data is evaluated.

This process obtains a change in the RF noise amplitude in corresponding time bins $t_i$ across successive frames $f_j$. At step 820, the process is complete, and the dynamic database controller 106 conducts an analysis of whether or not a detected RF noise may be repetitive. If a repetitive RF noise is found through this analysis, it can be avoided thereby improving the quality and reliability of UWB communications performed according to the present invention.

Figure 9:
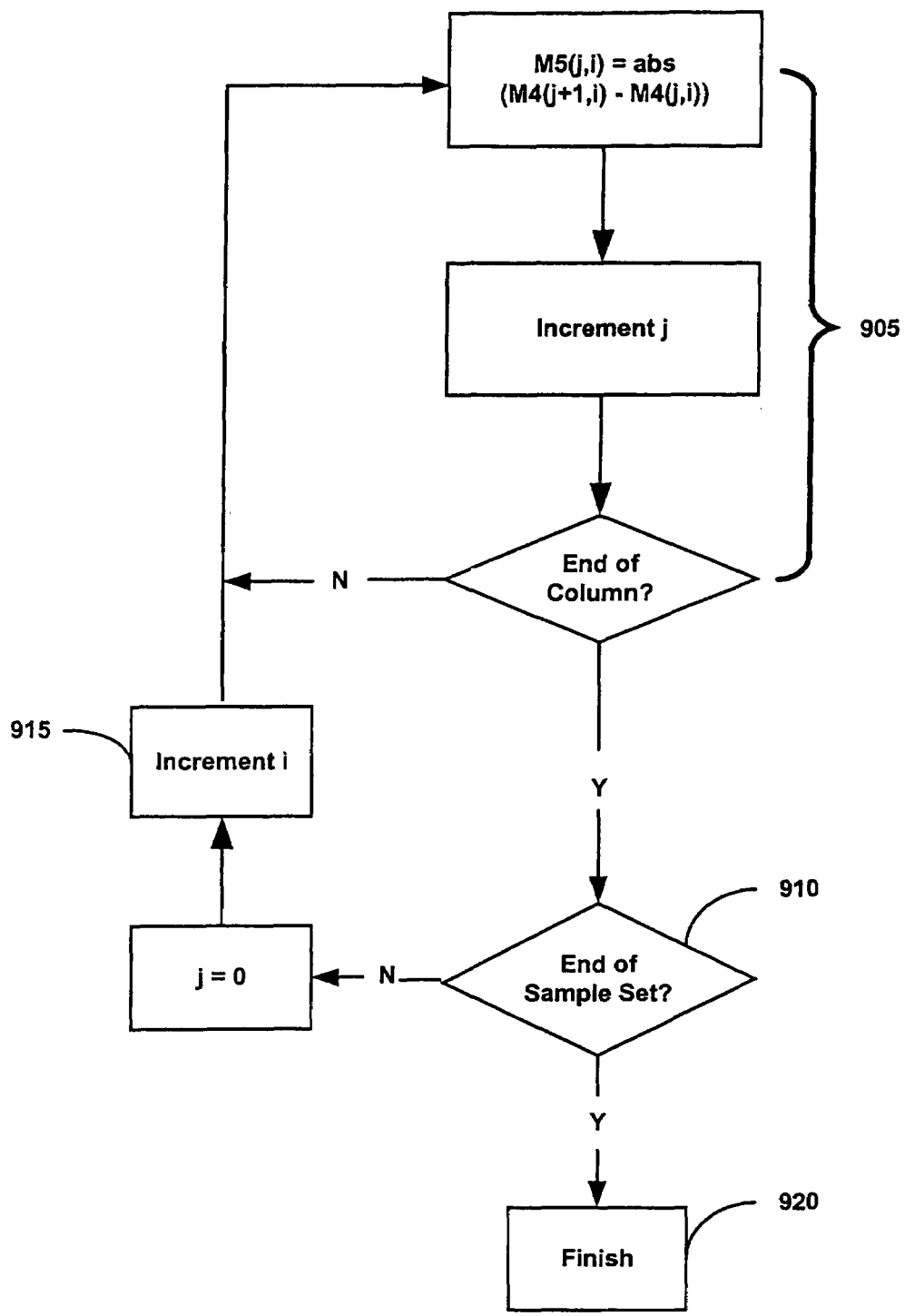
FIG. 9 is a schematic diagram of another embodiment for analyzing RF noise in accordance with another embodiment of the present invention.

Referring to FIG. 9, a process to obtain a second difference of the same time bin $t_i$ over multiple frames $f_j$ is illustrated. This process is expressed by the following equation (7):

$$M5_{ji} = |M4_{i+1} - M4_i| \tag{7}$$

In the above equation, the rate of change of the RF noise amplitude in corresponding time bins $t_i$ across successive frames $f_j$ is determined. In step 905, the absolute value of the difference of the change in the same time bins $t_i$ across multiple frames $f_j$ is obtained. In step 910, when the end of a column of frames $f_j$ is reached, the program increments to the next time bin $t_i$ in step 915. This process is repeated until all of the differences of the same time bins $t_i$ are obtained for all frames $f_j$. In step 920, the process is complete, and the dynamic database controller 106 uses this information to determine the rate of change of the RF noise amplitude data in corresponding time bins $t_i$. The rate of change information can help to determine the characteristic of the RF noise amplitudes in specific time bins $t_i$.

Figure 10:
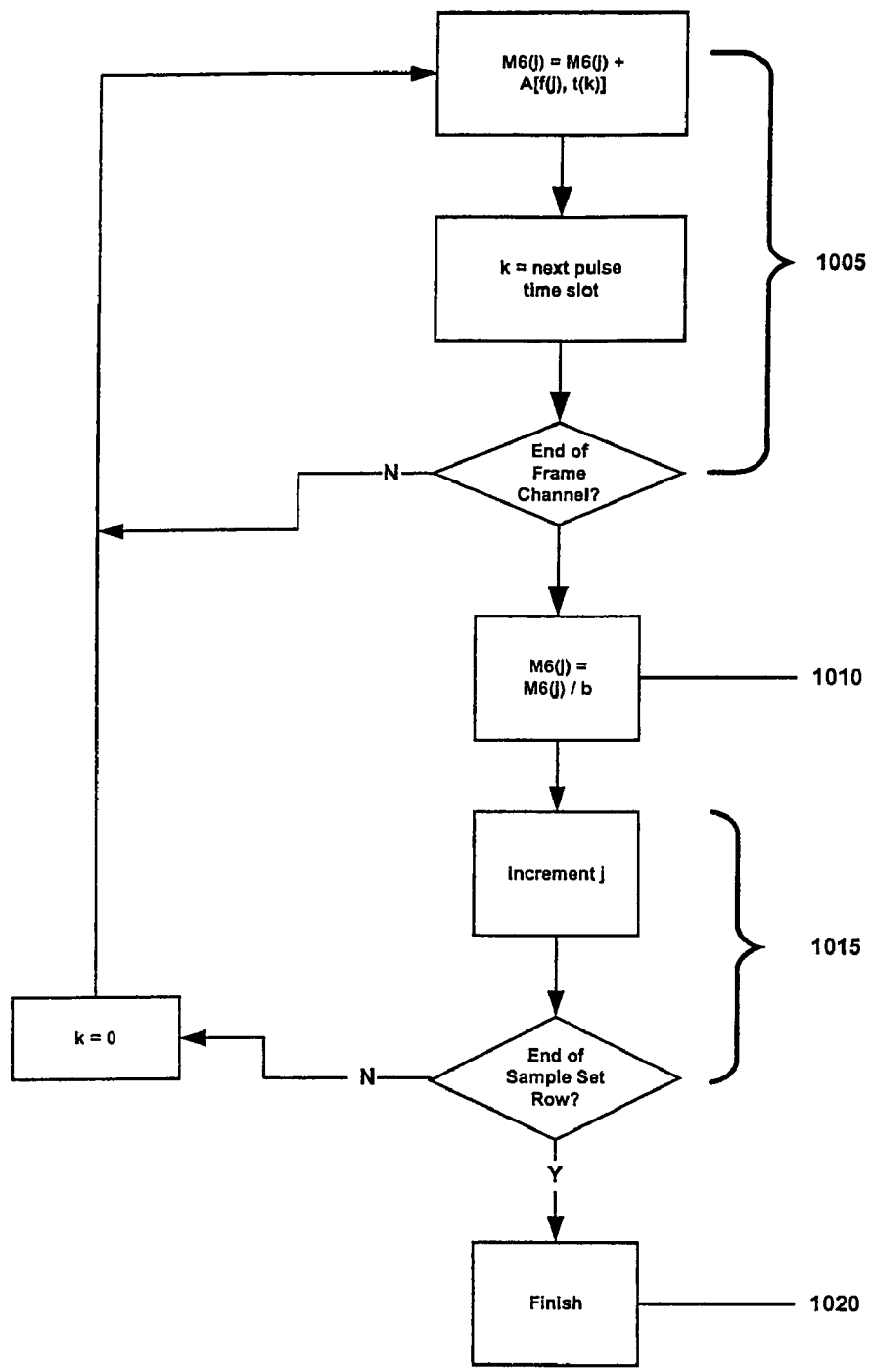
FIG. 10 is a schematic diagram of another embodiment for analyzing RF noise in accordance with another embodiment of the present invention.
Figure 11:
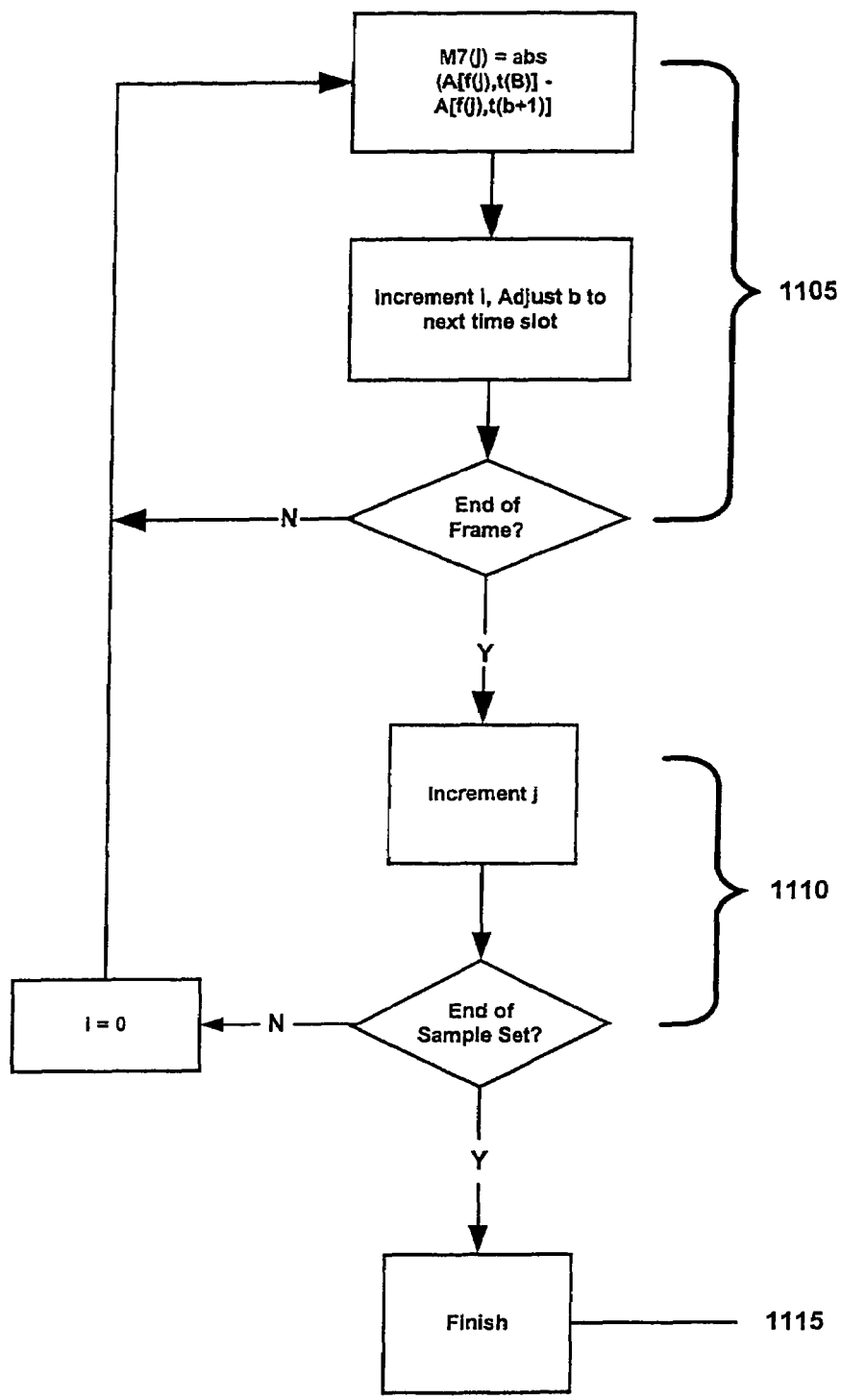
FIG. 11 is a schematic diagram of another method for analyzing RF noise in accordance with another embodiment of the present invention.
Figure 12:
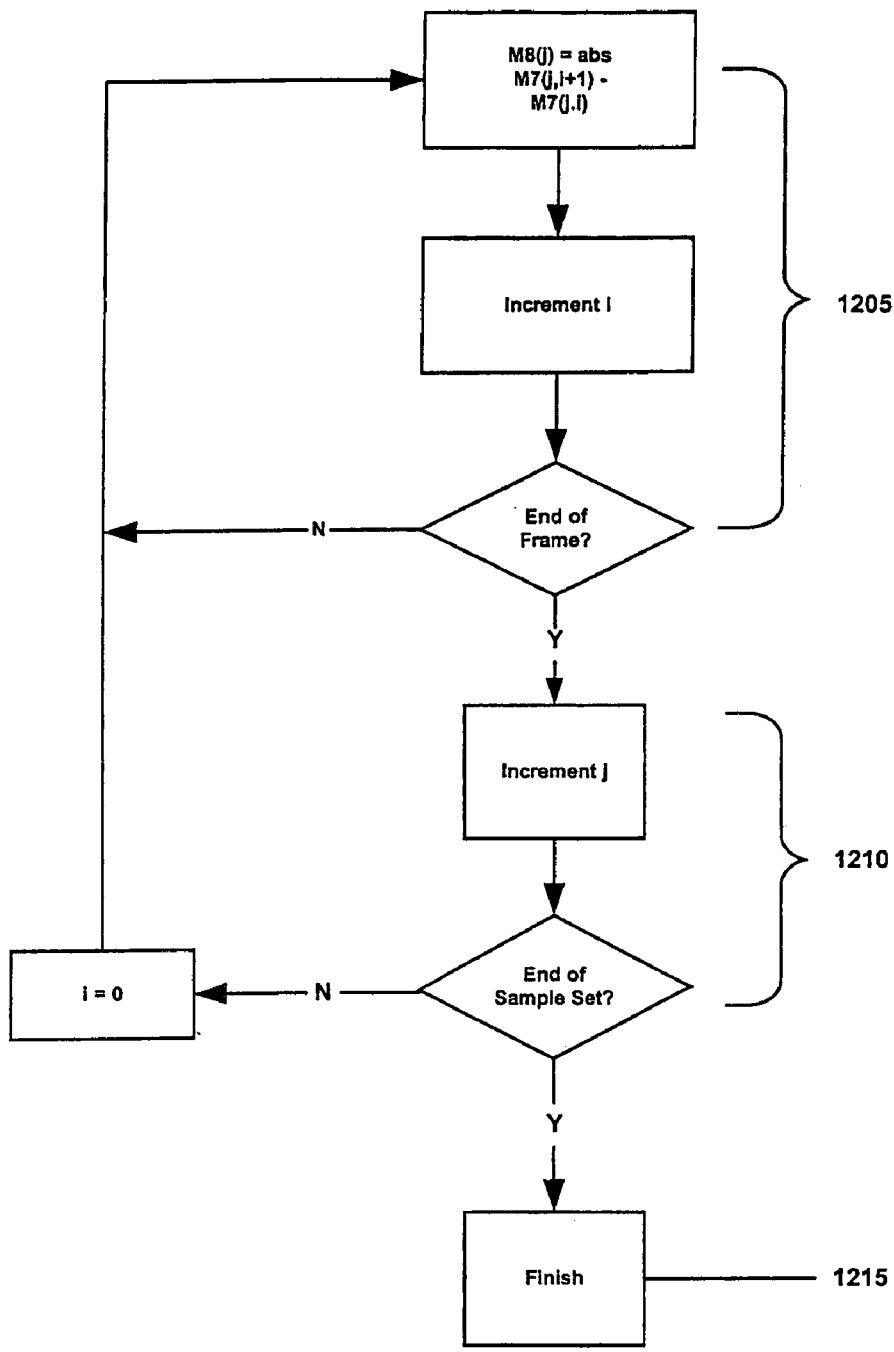
FIG. 12 is a schematic diagram of another method for analyzing RF noise in accordance with another embodiment of the present invention.

Referring to FIGS. 10-12, a preferred embodiment of the present invention is illustrated. Shown in FIGS. 10-12 are processes used to examine RF noise amplitude in pseudo-randomly spaced time bins. As discussed in prior sections, pseudo-random distribution of time bins is accomplished through "time-hopping." In a preferred embodiment of the invention, a plurality of pseudo-randomly spaced time bins are selected and allocated to a specific channel. In this manner, a plurality of channels each comprising a plurality of time bins that do not overlap can be transmitted simultaneously. The number of time bins in each channel is determined according to the bandwidth requirement for the type of information communicated in that channel. As discussed above, the plurality of pseudo-randomly spaced time bins are located within a frame f. The number of channels possible in a frame is determined according to the following equation: possible channels=(int) N/b. That is, the number of possible channels equals the integer portion of the quotient of the number of time bins available per frame divided by the desired time bins per channel per frame.

Referring to FIG. 10, a process to obtain a sample average of a single channel comprising a plurality of time bins $t_k$ located in multiple frames $f_j$ is illustrated. The sample averaging of the plurality of frames $f_j$ and time bins $t_i$ is expressed by the following equation (8):

$$\overline{M6_i} = \frac{1}{N+1} \sum_{j=0}^{N} \sum_{k=1}^{b} A(f_j t_k) \tag{8}$$

In the above equation, $f_j$ is equal to frame j, $t_k$ is the $k^{th}$ time bin allocated to the same channel and frame $f_j$, k is a frame-periodic pseudo-noise sequence of length b and N is the number of frames over which the sequence is averaged. Illustrated in FIG. 10 is a flowchart illustrating the steps a program will perform to analyze sampled RF noise data.

The following data sample matrix T is used by equation (8). Matrix T represents one sample set of collected RF noise data, wherein each row is one frame of data and each column represents a pseudo-randomly placed time bin t. If N+1 frames are sampled with b time bins in each frame, then the stored matrix is as depicted in T. $A(f_j t_b)$ is the amplitude detected in the center of the time bins $t_b$ in frame $f_j$:

$$T = \begin{bmatrix} A(f_0 t_0) & A(f_0 t_1) & \cdots & A(f_0 t_b) \\ A(f_1 t_0) & A(f_1 t_1) & \cdots & A(f_1 t_b) \\ \vdots & \vdots & & \\ A(f_{N-1} t_0) & A(f_{N-1} t_1) & \cdots & A(f_{N-1} t_b) \\ A(f_N t_0) & A(f_N t_1) & \cdots & A(f_N t_b) \end{bmatrix}$$

In step 1005, the RF noise amplitude found in the same pseudo-randomly placed time bin $t_b$ in each frame $f_j$ is summed. In step 1010, that sum of RF noise amplitudes is averaged. In step 1015, the program moves to the next column representing a second pseudo-randomly placed time bin $t_b$. The sum for the second column is then averaged in step 1005, and this process of summing each column representing a pseudo-randomly placed time bin $t_b$ is repeated until all of the pseudo-randomly placed time bins $t_b$ in all of the frames $f_j$ have been summed and averaged, finishing at step 1020. The resultant average for each pseudo-randomly placed time bin $t_b$ represents the average RF noise amplitude for that specific channel to which the pseudo-randomly placed time bins $t_b$ have been allocated. After step 1020, the RF noise amplitudes for the specific channel can then be evaluated to detect if a periodic signal or other types of RF noise are present. If RF noise is present, an estimation of the effect of the noise on the transmission quality is performed by the dynamic database controller 106, illustrated in FIG. 2. Additionally, the data obtained from the process illustrated in FIG. 10 can be used to rank channel quality based on the RF noise present in that UWB communication channel.

Referring to FIG. 11, another process according to the present invention is illustrated which evaluates the RF noise amplitude data. The process illustrated in FIG. 11 takes a first difference of pseudo-randomly placed time bins $t_b$ within a frame $f_j$. This is expressed by the following equation (9):

$$M7_j = |A(f_jt_l) - A(f_jt_k)|, \quad (9)$$

where $t_l$ is the pseudo-randomly placed time bin that follows $t_k$, in the pseudo-randomly placed sequence allocated to a specific UWB communication channel. That is, $t_l$ is not the temporally next time bin but instead is the time bin that next follows $t_k$ in a sequence of pseudo-randomly placed time bins. In step 1105, the difference of the amplitudes of RF noise samples in pseudo-randomly placed time bins $t_b$ in the same frame $f_j$ is taken. This process is repeated until all of the pseudo-randomly placed time bins $t_l$ allocated to a specific channel in one frame $f_j$ have been evaluated. In step 1110, when the end of the frame $f_j$ is reached, the next frame $f_j$ is analyzed according to step 1105. In this manner, all of the pseudo-randomly placed time bins $t_b$ in a plurality of frames $f_j$ are evaluated. This first difference calculation $M7_j$ obtains the difference in RF noise amplitudes in sequential pseudo-randomly placed time bins within a frame. At step 1115, when all of the RF noise samples have been analyzed, this information may be used to determine if the RF noise is increasing or decreasing in the specific UWB communication channel that has been allocated to those sampled pseudo-randomly placed time bins $t_b$. Alternatively, the data obtained by equation (8) can be used to obtain the absolute value of a difference of the RF noise amplitude averages in channel adjacent pseudo-randomly placed time bins $t_b$. This process is expressed by the following equation (10):

$$\overline{M7}_j = |\overline{M6}_l - \overline{M6}_k| \quad (10)$$

In equation (10), an absolute value of the difference between averaged RF noise samples in channel adjacent pseudo-randomly placed time bins $t_b$ is obtained. $M6_l$ is the time bin that follows $M6_k$ in a sequence of pseudo-randomly placed time bins allocated to a specific UWB communication channel. These time bins are referred to as "channel adjacent" time bins. The data obtained after this analysis will be used by the dynamic database controller 106, or other suitable device to determine the change in RF noise amplitudes in a UWB communication channel that has been allocated specific pseudo-randomly placed time bins.

Referring to FIG. 12, a process to obtain a second difference of pseudo-random time bins $t_b$ is illustrated. This process uses the data obtained from equation (10). The process illustrated in FIG. 12 takes a second difference of channel adjacent pseudo-randomly placed time bins $t_b$ within a frame $f_j$. This is expressed by the following equation (11):

$$M8_j = |M7_l - M7_k| \quad (11)$$

Again, $M7_l$, is the time bin that follows $M7_k$ in a sequence of pseudo-randomly placed time bins allocated to a specific UWB communication channel.

In step 1205, the absolute value of the difference of the change in channel adjacent pseudo-randomly placed time bins $t_b$ in the same frame $f_j$ is obtained. This process is repeated in step 1205 until all of the data from equation (10) has been evaluated. In step 1210, when the end of the frame $f_j$ is reached, the next frame $f_j$ is analyzed according to step 1205. In this manner, all of the data from equation (10) is evaluated. This second difference calculation $M8_j$ obtains the second difference of RF noise amplitudes of channel adjacent time bins $t_b$ within a frame $f_j$. At step 1215, when all of the RF noise samples have been analyzed, this information may be used to determine the quality of a channel which will later be used in the process for ranking channels to be described below.

Alternatively, the data obtained by equation (10) can be used to obtain the absolute value of a second difference of channel adjacent time bin $t_b$ RF noise amplitude averages. This process is expressed in the following equation (12):

$$\overline{M8}_j = |\overline{M7}_l - \overline{M7}_k| \quad (12)$$

In equation (12) an absolute value of the second difference between averaged RF noise samples in channel adjacent time bins $t_b$ is obtained. This data is used by the dynamic database controller 106, or other suitable device to determine the rate of change, or how fast the RF noise amplitudes in adjacent pseudo-random time bins $t_b$ is changing.

The above-described methods and processes are used to obtain and manipulate data used for evaluating RF noise amplitudes that may be present during transmission of a UWB communication channel constructed according to the present invention. The above-described methods quantify the type of RF noise that may be present. For example, narrow duration noise, wide duration noise, additive white Gaussian noise, repetitive noise, and other types of RF noise can all be evaluated using the above-described methods. This information is used to grade or rank each UWB channel that is to be transmitted. In one embodiment of the present invention, time bins will be created to correspond with each UWB channel's statistical probability for optimum suitability in descending order from channels of highest quality to channels of lowest quality. For example, a channel assigned for the transmission of data which requires high transmission rates would receive a high quality channel containing low or non-existent amounts of RF noise. A UWB channel assigned to carry video data may receive a slightly lower quality channel that has slightly higher amounts of RF noise present. A UWB channel for transmitting audio signals may receive a low quality channel containing high amounts of RF noise, and some UWB channels may not be allocated any data because analysis has indicated that the RF noise present is too great to carry any data reliably.

The information derived from the above-described methods may be used to grade and assign each channel into time bins identified for optimum channel bandwidth. Time bins will ideally be created to correspond to each channel's statistical probability for optimum suitability in descending order from Data (channels of highest quality), Video (next highest quality), Audio (lowest quality) and "Not Suitable" (channel quality is not suitable for pulse train insertion).

The reliability of a UWB communication channel constructed according to the present invention can be evaluated by determining the projected bit error rate (PBER). One process for evaluating a PBER in a UWB channel constructed according to the present invention is expressed in the following equation (13):

$$PBER = -\frac{\ln(1-CL)}{n} + \frac{\ln\left(\sum_{k=0}^{N}\frac{(n \cdot PBER)^k}{k!}\right)}{n} \quad (13)$$

where n is the number of bits transmitted in an ultra-wideband communication channel, and CL is the confidence level (that is, the statistical confidence that the bit error rate (BER) will be less than or equal to the PBER). N is the total number of bit errors that occur during the transmission, and k refers to the $k^{th}$ bit error. This equation can be solved by iterative methods by inserting CL, and yields a PBER that is constantly updated as a transmission proceeds. For example, a CL of 0.95 can be inserted into the equation and a PBER can be determined. As the PBER changes, the amount of data transmitted may be decreased to maintain channel quality or the data transmission on that specific channel may be terminated and switched to another ultra-wideband channel with a lower PBER.

Figure 13:
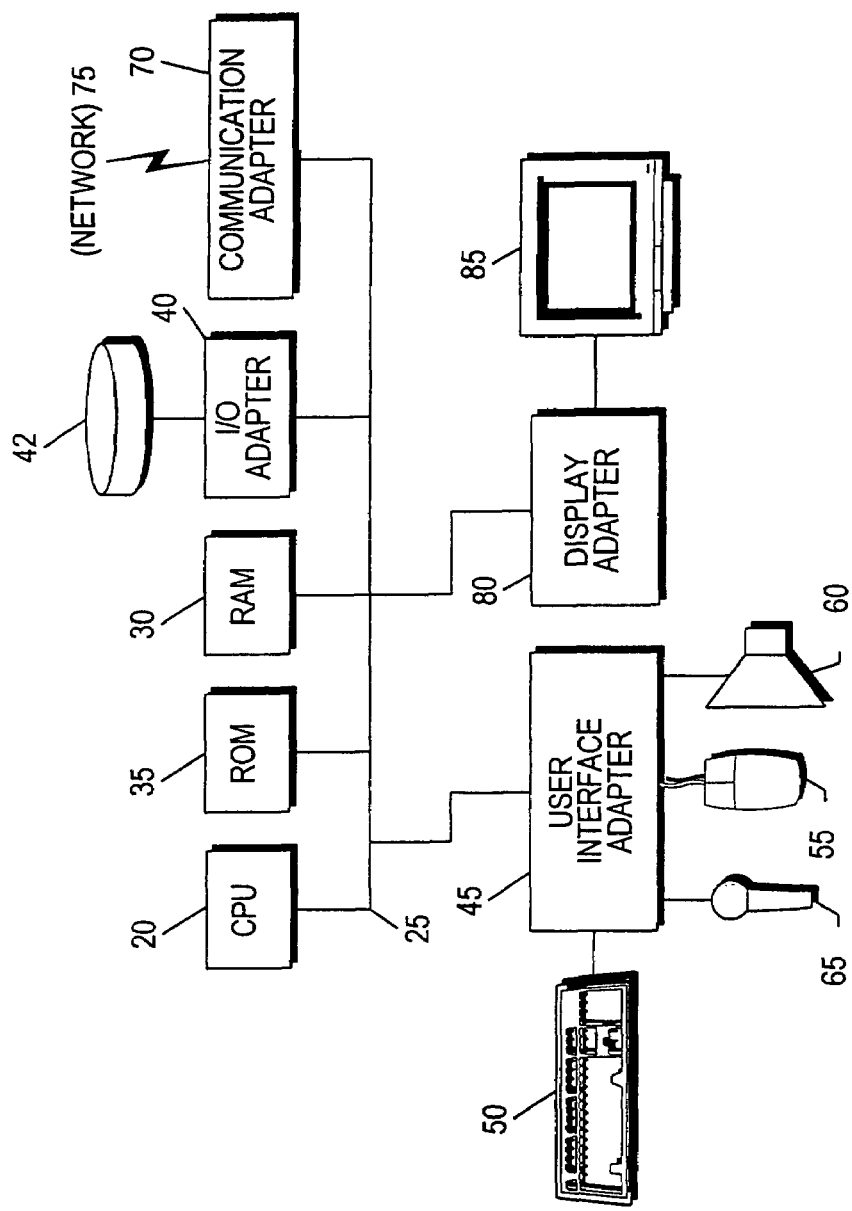
FIG. 13 is a schematic diagram of a representative hardware environment in accordance with an embodiment of the present invention.

FIG. 13 illustrates a representative hardware environment or workstation by which embodiments of the present invention may be carried out. In the present invention, the various sub-components of each of the components embodying the invention may also be considered components of the UWB communication system. For example, particular software modules executed on any component of the system may also be considered components of the system. The hardware configuration illustrated in FIG. 13 includes a central processing unit 20 such as a microprocessor, and a number of other units interconnected via a system bus 25.

The workstation shown in FIG. 13 includes a Random Access Memory (RAM) 30, Read Only Memory (ROM) 35, an I/O adapter 40 for connecting peripheral devices such as disk storage units 42 to the bus 25, a user interface adapter 45 for connecting a keyboard 50, a mouse 55, a speaker 60, a microphone 65, and/or other user interface devices such as a touch screen (not shown) to the bus 25, communication adapter 70 for connecting the workstation to a communication network 75 (e.g., a data processing network) and a display adapter 80 for connecting the bus 25 to a display device 85.

An embodiment of the present invention may he written using JAVA, C, C++, or other suitable computer languages and may utilize object oriented programming methodology.

It will be appreciated that any device employing ultra-wideband technology may employ the present invention. For example, the present invention may be employed in a phone, a radio, a personal digital assistant, a portable computer, a laptop computer, a desktop computer, a mainframe computer, any UWB network, such as a LAN, WAN, PAN etc., video monitors, computer monitors, or any other device employing UWB technology, or other devices that may not use UWB technology.

For example, it will be appreciated that embodiments of the present invention may be employed by any communication system, such as a cellular phone network, a television broadcaster, a radio broadcaster, an Internet service provider, a fire or police communication system, and other communication systems. For example, a communication system may be established near a fire. The communication system may map, or perform a "clear channel assessment" of portions of the radio frequency spectrum, to determine communication parameters, such as which frequency to use, a transmission power, a modulation method, and/or other communication parameters.

Figure 14:
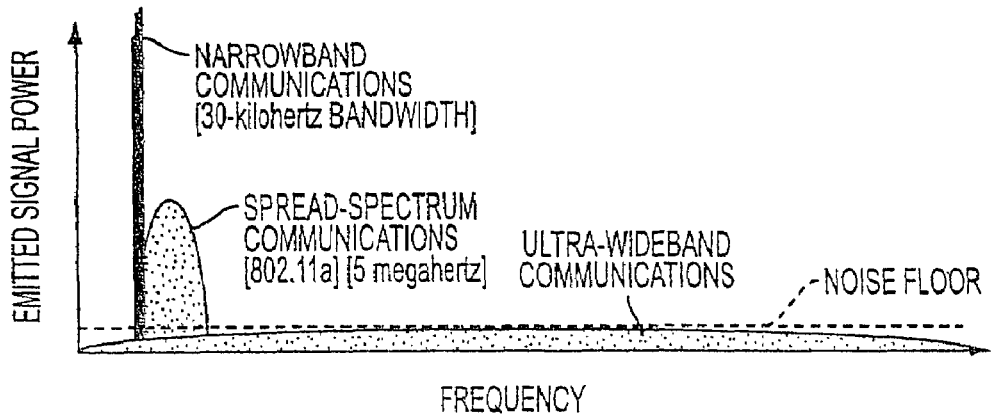
FIG. 14 is an illustration of different communication methods.
Figure 15:
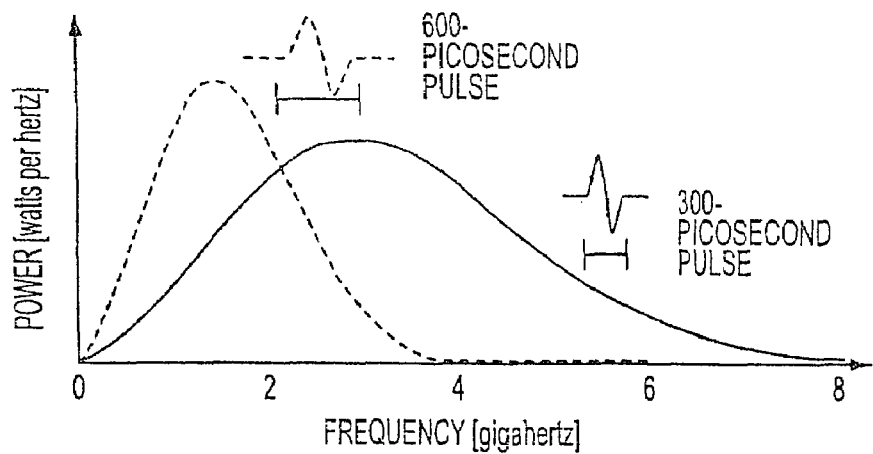
FIG. 15 is an illustration of two ultra-wideband pulses.

As discussed above, one embodiment of the present invention relates to ultra-wideband technology. As shown in FIGS. 14 and 15, ultra-wideband technology is fundamentally different when compared with conventional carrier wave communication technology. Ultra-wideband (UWB) communication technology employs discrete pulses of electromagnetic energy that are emitted at, for example, nanosecond or picosecond intervals (generally tens of picoseconds to hundreds of nanoseconds in duration). For this reason, ultra-wideband is often called "impulse radio." That is, the UWB pulses may be transmitted without modulation onto a sine wave, or a sinusoidal carrier, in contrast with conventional carrier wave communication technology. Thus, UWB generally requires neither an assigned frequency nor a power amplifier.

Examples of conventional sinusoidal carrier wave communication technology are illustrated in FIG. 14. IEEE 802.11a is a wireless local area network (LAN) protocol, which transmits a sinusoidal radio frequency signal at a 5 GHz center frequency, with a radio frequency spread of about 5 MHz. As defined herein, a carrier wave is an electromagnetic wave of a specified frequency and amplitude that is emitted by a radio transmitter in order to carry information. The 802.11 protocol is an example of a carrier wave communication technology. The carrier wave comprises a substantially continuous sinusoidal waveform having a specific narrow radio frequency (5 MHz) that has a duration that may range from seconds to minutes.

In contrast, an ultra-wideband (UWB) pulse may have a 2.0 GHz center frequency, with a frequency spread of approximately 4 GHz, as shown in FIG. 15, which illustrates two typical UWB pulses. FIG. 15 illustrates that the shorter the UWB pulse in time, the broader the spread of its frequency spectrum. This is because bandwidth is inversely proportional to the time duration of the pulse. A 600-picosecond UWB pulse can have about a 1.8 GHz center frequency, with a frequency spread of approximately 1.6 GHz and a 300-picosecond UWB pulse can have about a 3 GHz center frequency, with a frequency spread of approximately 3.2 GHz. Thus, UWB pulses generally do not operate within a specific frequency, as shown in FIG. 14. In addition, either of the pulses shown in FIG. 15 may be frequency shifted, for example, by using heterodyning, to have essentially the same bandwidth but centered at any desired frequency. And because UWB pulses are spread across an extremely wide frequency range, UWB communication systems allow communications at very high data rates, such as 100 megabits per second or greater.

Also, because the UWB pulses are spread across an extremely wide frequency range, the power sampled in, for example, a one megahertz bandwidth, is very low. For example, UWB pulses of one nano-second duration and one milliwatt average power (0 dBm) spreads the power over the entire one gigahertz frequency band occupied by the pulse. The resulting power density is thus 1 milliwatt divided by the 1,000 MHz pulse bandwidth, or 0.001 milliwatt per megahertz (−30 dBm/MHz).

Generally, in the case of wireless communications, a multiplicity of UWB pulses may be transmitted at relatively low power density (milliwatts per megahertz). However, an alternative UWB communication system may transmit at a higher power density. For example, UWB pulses may be transmitted between 30 dBm to −50 dBm.

Several different methods of ultra-wideband (UWB) communications have been proposed. For wireless UWB communications in the United States, all of these methods must meet the constraints recently established by the Federal Communications Commission (FCC) in their Report and Order issued Apr. 22, 2002 (ET Docket 98-153). Currently, the FCC is allowing limited UWB communications, but as UWB systems are deployed, and additional experience with this new technology is gained, the FCC may expand the use of UWB communication technology. It will be appreciated that the present invention may be applied to current forms of UWB communications, as well as to future variations and/or varieties of UWB communication technology.

For example, the April 22 Report and Order requires that UWB pulses, or signals occupy greater than 20% fractional bandwidth or 500 megahertz, whichever is smaller. Fractional bandwidth is defined as 2 times the difference between the high and low 10 dB cutoff frequencies divided by the sum of the high and low 10 dB cutoff frequencies. However, these requirements for wireless UWB communications in the United States may change in the future.

Communication standards committees associated with the International Institute of Electrical and Electronics Engineers (IEEE) are considering a number of ultra-wideband (UWB) wireless communication methods that meet the current constraints established by the FCC. One UWB communication method may transmit UWB pulses that occupy 500 MHz bands within the 7.5 GHz FCC allocation (from 3.1 GHz to 10.6 GHz). In one embodiment of this communication method, UWB pulses have about a 2-nanosecond duration, which corresponds to about a 500 MHz bandwidth. The center frequency of the UWB pulses can be varied to place them wherever desired within the 7.5 GHz allocation. In another embodiment of this communication method, an Inverse Fast Fourier Transform (IFFT) is performed on parallel data to produce 122 carriers, each approximately 4.125 MHz wide. In this embodiment, also known as Orthogonal Frequency Division Multiplexing (OFDM), the resultant UWB pulse, or signal is approximately 506 MHz wide, and has a 242 nanosecond duration. It meets the FCC rules for UWB communications because it is an aggregation of many relatively narrow band carriers rather than because of the duration of each pulse.

Another UWB communication method being evaluated by the IEEE standards committees comprises transmitting discrete UWB pulses that occupy greater than 500 MHz of frequency spectrum. For example, in one embodiment of this communication method, UWB pulse durations may vary from 2 nanoseconds, which occupies about 500 MHz, to about 133 picoseconds, which occupies about 7.5 GHz of bandwidth. That is, a single UWB pulse may occupy substantially all of the entire allocation for communications (from 3.1 GHz to 10.6 GHz).

Yet another UWB communication method being evaluated by the IEEE standards committees comprises transmitting a sequence of pulses that may be approximately 0.7 nanoseconds or less in duration, and at a chipping rate of approximately 1.4 giga pulses per second. The pulses are modulated using a Direct-Sequence modulation technique, and is called DS-UWB. Operation in two bands is contemplated, with one band is centered near 4 GHz with a 1.4 GHz wide signal, while the second band is centered near 8 GHz, with a 2.8 GHz wide UWB signal. Operation may occur at either or both of the UWB bands. Data rates between about 28 Megabits/second to as much as 1,320 Megabits/second are contemplated.

Thus, described above are three different methods of wireless ultra-wideband (UWB) communication. It will be appreciated that the present invention may be employed using any one of the above-described methods, variants of the above methods, other UWB communication methods yet to be developed, or the present invention may be employed by non-UWB communication systems, such as conventional carrier wave communication systems.

The UWB devices, systems and/or methods in the embodiments described herein communicate with each other by transmitting and receiving a plurality of discrete electromagnetic pulses, as opposed to a substantially continuous carrier wave. Each pulse may have a duration that can range between about 10 picoseconds to about 1 microsecond, and a power that may range between about +30 dBm to about −60 dBm, as measured at a single frequency.

In addition, the present invention may be employed in any type of network, be it wireless, wire, or a mix of wire media and wireless components. That is, a network may use both wire media, such as coaxial cable, and wireless devices, such as satellites, or cellular antennas. As defined herein, a network is a group of points or nodes connected by communication paths. The communication paths may use wires or they may be wireless. A network as defined herein can interconnect with other networks and contain sub-networks. A network as defined herein can be characterized in terms of a spatial distance, for example, such as a local area network (LAN), a personal area network (PAN), a metropolitan area network (MAN), a wide area network (WAN), and a wireless personal area network (WPAN), among others. A network as defined herein can also be characterized by the type of data transmission technology used by the network, such as, for example, a Transmission Control Protocol/Internet Protocol (TCP/IP) network, a Systems Network Architecture network, among others. A network as defined herein can also be characterized by whether it carries voice, data, or both kinds of signals. A network as defined herein may also be characterized by users of the network, such as, for example, users of a public switched telephone network (PSTN) or other type of public network, and private networks (such as within a single room or home), among others. A network as defined herein can also be characterized by the usual nature of its connections, for example, a dial-up network, a switched network, a dedicated network, and a non-switched network, among others. A network as defined herein can also be characterized by the types of physical links that it employs, for example, optical fiber, coaxial cable, a mix of both, unshielded twisted pair, and shielded twisted pair, among others.

The present invention may be employed in any type of wireless network, such as a wireless PAN, LAN, MAN, or WAN. In addition, the present invention may be employed in wire media, as the present invention dramatically increases the bandwidth of conventional networks that employ wire media, such as hybrid fiber-coax cable networks, or CATV networks, yet it can be inexpensively deployed without extensive modification to the existing wire media network.

Figure 16:
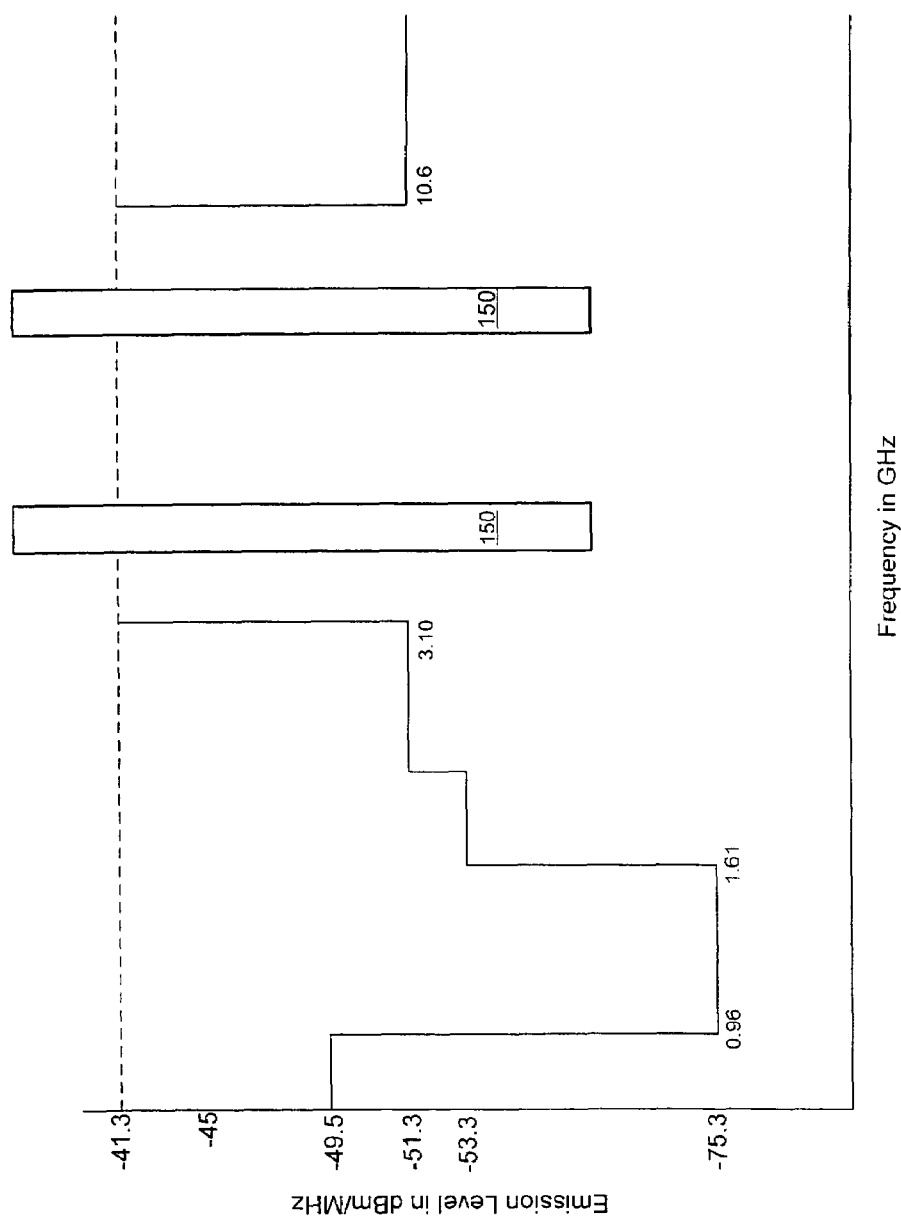
FIG. 16 shows two signals occupying two bands of the radio frequency spectrum.
Figure 17:
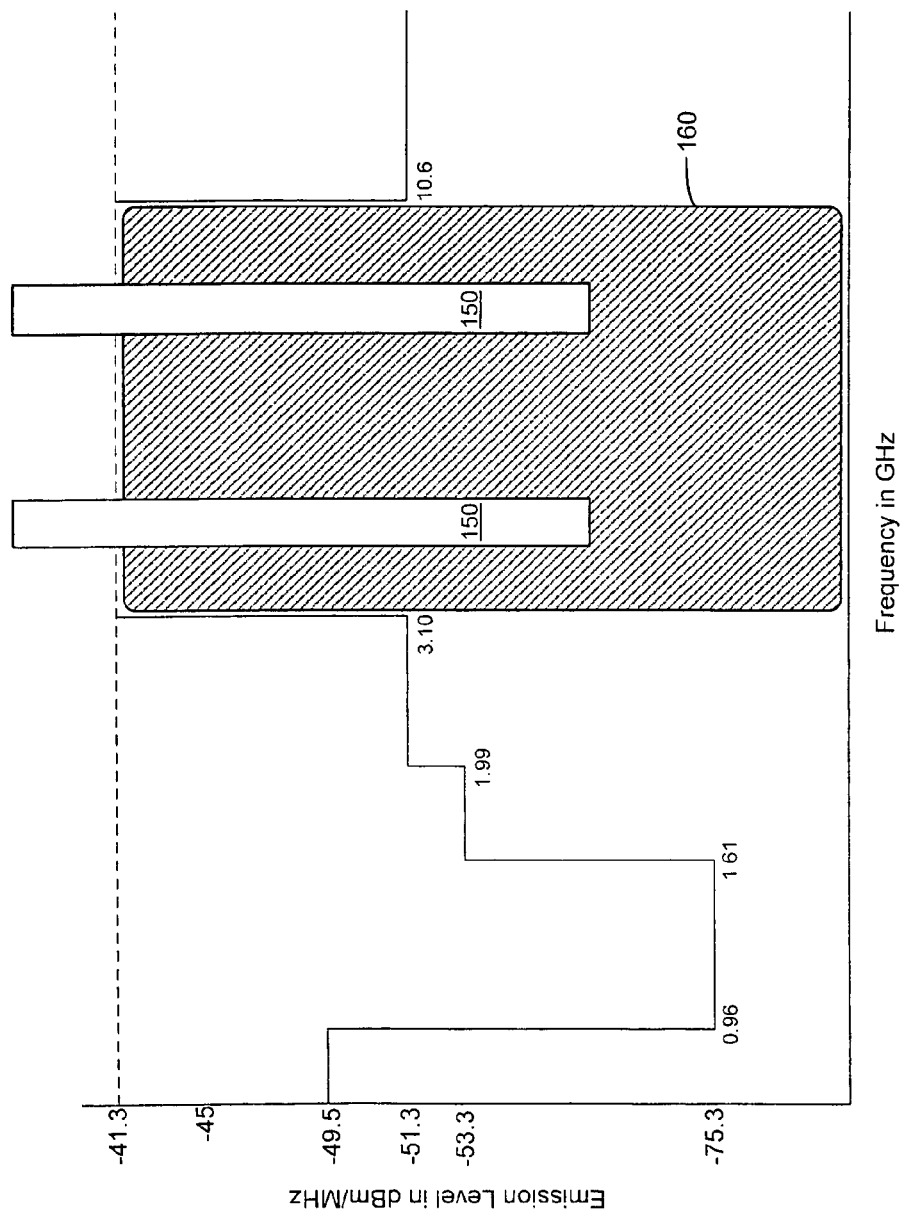
FIG. 17 shows the frequency spectrum occupied by of one or more ultra-wideband signals or pulses that avoid the radio frequency bands occupied by the two signals illustrated in FIG. 16.

Referring now to FIGS. 16 and 17, additional embodiments of the present invention will be described. In one embodiment, ultra-wideband communication device initially "listens" in the receive mode for a time period prior to transmission. Received signals are sampled and the noise floor is "mapped." Methods of mapping may include conversion to the frequency domain with the use of a Fast Fourier Transform. Amplitudes of the received signals are then used to determine which frequencies and/or time bins would be the most affected by the radio frequency noise. This mapping, or clear channel assessment may be repeated periodically.

As shown in FIG. 16, one feature of mapping, or clear channel assessment is that by listening and mapping the noise floor, an ultra-wideband (UWB) communication device may identify signals 150 that may be sensitive to, or interfered by UWB signal content. FIG. 16 shows a portion of the radio frequency spectrum, and the current FCC emission mask for ultra-wideband communications. Narrow band signals 150 are present in a portion of the spectrum that may be used by an ultra-wideband communication system. However, other types of "noise" may also be present. "Noise" as defined herein is any disturbance, or energy present in a radio frequency band of interest. For example, as mentioned above, "noise" may be additive white Gaussian noise, repetitive noise, narrow or wide duration noise, or other natural or man-made energy present in a radio frequency band of interest.

Because the noise, in this example a narrow band signal 150, may be within the desired radio frequency spectrum of a UWB signal, the UWB receiver may adapt to suppress the energy at the frequency of the detected signal 150 and thus avoid potentially saturating the front end of the UWB receiver.

Referring now to FIG. 17, once the mapping, or clear channel assessment is initially completed, a UWB device may initiate communications with other UWB devices. For example, when an UWB device detects the presence of other signals 150, such as intentional radiators, or strong unintentional radiators, the UWB device may perform one or more of the following functions: select a pulse shape, select a pulse recurrence frequency, select a power level, and/or select a communication channel (i.e., a radio frequency band), that effectively avoid the signals 150. In the example shown in FIG. 17, after selecting one or more of the just-described functions, the device may transmit a signal, or a plurality of UWB pulses that occupy all of or portions of the spectrum 160, thus avoiding the frequency bands where the signals 150 are present. In a communication system having one or more access points or nodes, which communicate with multiple other communication devices, the nodes may transmit data at higher data rates than the other communication devices. In this case, the peak-to-average power ratio of the node, or access point may be higher than the peak-to-average power ratio of the other communication devices.

Because narrow band signals may be transient in their transmission, the mapping or clear channel assessment may be repeated at periodic intervals. In one embodiment of the present invention, a UWB transceiver may periodically re-map the RF noise floor and if narrow band signals are present the UWB device may cease any transmission. Alternatively, if the UWB device determines that there are narrow band signals present it may adapt its emissions to avoid the frequency(s) occupied by the narrow band signal and it may also notify any receivers in the area to likewise adjust their emissions.

In another embodiment of the present invention, lower quality UWB communication channels may be used for signaling, network logon and protocol negotiation. In this embodiment, the transmission power may be increased to overcome noise present in the lower-quality channel. Since the data rate required for signaling is significantly lower than for multimedia and/or video data transfer, the transmissions in the lower quality channels may be repeated a number of times to increase the likelihood of complete reception.

In yet another embodiment of the present invention, communication parameters may be selected based on the RF noise present in a desired communication channel. In this embodiment the presence of a noise signal that occupies a specific portion of the radio frequency (RF) spectrum may be avoided by shaping the UWB signal to avoid the frequency(s) where the stronger signal resides. For example, with reference to FIG. 17, RF signals 150 may either be intentional in-band emissions, such as carrier-based communication signals, or they may be unintentional noise. In the case where the strong signal 150 is an intentional emission it is desirable to avoid emission of UWB energy at that frequency. Limiting the amount of transmitted UWB energy may be accomplished by shaping the UWB signal so it doesn't contain a significant amount of energy at the radio frequency of interest. In one embodiment, this shaping may comprise filtering the generated signal to attenuate emissions at the RF band occupied by the signals 150. In another embodiment, the signal may be constructed to avoid the RF signals 150 by an arbitrary waveform generator, which can tailor the spectrum occupied by a UWB signal or pulse. The constructed signal, or UWB pulses may occupy all of, or portions of the available spectrum 160 around the RF signals 150. Knowledge of the pulse shape is then communicated to the intended receiver, and communications are conducted with shaped signal.

It is known that some sources of RF noise are periodic. For example, a microwave oven operates on a fixed duty cycle where it radiates for a fixed time period at a fixed radio frequency band, and is dormant for a fixed time period. In the presence of this type, or similar periodic noise that does not change in frequency, the communication parameters, such as the frequency(s) used to transmit data, for a device employing the present invention may remain constant. For example, radio frequencies other than those occupied by the microwave emissions may be used.

However, other noise sources are more transient, or even random in nature, and may require a UWB communication system constructed according to the present invention to periodically re-map the RF noise floor and adapt to the changing noise. In one embodiment of the present invention, the need to re-map the noise floor may be a function of the received bit-error-rate (BER). In this embodiment, when the received BER exceeds a fixed threshold, the re-mapping and re-selection of communication parameters, such as transmission frequency(s) is initialized. One feature of this embodiment is that it allows for a method for dynamically improving the Quality Of Service (QoS) of the channel. That is, a the BER increases, communication parameter(s) may be changed to improve QoS.

In a UWB communication system of the present invention that employs a coherent detection receiver(s), noise can degrade the Received Signal Strength Indication (RSSI), if measured at the output of a correlator. In one embodiment of the present invention, the need to re-map the noise may be a function of RSSI. When the RSSI measured after correlation degrades to below a threshold, re-mapping and re-selection of one or more communication parameters may begin. One feature of this embodiment is that it improves the signal-to-noise (SNR) of the receiver by adapting the transmitted UWB pulse shape to one more closely duplicated by the correlating receiver.

In another embodiment of the present invention, a network access point, such as a fixed or mobile UWB transceiver, may be communicating with a plurality of UWB devices. In this embodiment, the network access point may employ a different set of communication parameters to support multiple devices. For example, one UWB device logged into an access point may be a mobile device with a lower QoS requirement for wireless Internet data. Another UWB device may be a wireless video terminal with a significantly higher QoS requirement for real-time streaming video. In this scenario the access point needs to support multiple UWB devices with inherently different requirements. The access point may therefore employ a higher pulse recurrence frequency (PRF) and therefore have a different peak-to-average power of transmission than either of the UWB devices it supports. Additionally, the high data rate, high QoS service requesting device may need to communicate using a higher complexity data modulation method, as compared to the low data rate, low QoS device.

Thus, it is seen that apparatus, systems and methods of mapping radio frequency noise, and adapting the transmission and reception of ultra-wideband, or other signals or pulses in response to the noise are provided. That is, the above methods and concepts of mapping radio frequency noise, and adapting communications in response to the mapping, may be applied by virtually any type of communication system, whether it employs ultra-wideband technology, conventional carrier wave technology, or other types of communication technology. For example, the above examples and methods of mapping radio frequency noise for ultra-wideband communications, may be employed by a communication system using conventional carrier wave technology.

One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A communication method, the method comprising the steps of:
   receiving an electromagnetic energy from a portion of a radio frequency spectrum;
   sampling the received energy, the sampling occurring in a time domain;
   converting the sampled energy into a frequency domain;
   analyzing the sampled energy in the frequency domain; and
   selecting at least one communication parameter based on the analysis of the sampled energy, the at least one communication parameter selected from at least one of a group consisting of: an ultra-wideband pulse recurrence frequency; a power of transmission; an ultra-wideband pulse shape; a communication frequency band; a communication channel; and a modulation method.

2. The communication method of claim 1, further comprising the step of transmitting the at least one selected communication parameter to at least one communication device.

3. The communication method of claim 1, further comprising the step of communicating using the at least one selected communication parameter.

4. The communication method of claim 1, further comprising first and second communication devices, wherein a peak-to-average power ratio of the first communication device and the peak-to-average power ratio of the second communication device are different.

5. The communication method of claim 1, wherein the step of sampling the received energy in the time domain comprises sampling the received energy at a sampling rate that can range between about 1 picosecond to about 1 microsecond.

6. The communication method of claim 1, further comprising the step of periodically repeating the steps of receiving, sampling and converting.

7. The communication method of claim 1, further comprising a communication device performing the steps of receiving, sampling, converting, analyzing and selecting in response to a received bit-error-rate at the communication device.

8. The communication method of claim 1, further comprising a communication device performing the steps of receiving, sampling, converting analyzing and selecting in response to a received signal strength indication at the communication device.

9. A communication method, comprising:
   means for receiving an electromagnetic energy from a portion of a radio frequency spectrum;
   means for sampling the received energy, the sampling occurring in a time domain;
   means for converting the sampled energy into a frequency domain;
   means for analyzing the sampled energy in the frequency domain; and
   means for selecting at least one communication parameter based on the analysis of the sampled energy, the at least one communication parameter selected from at least one of a group consisting of: an ultra-wideband pulse recurrence frequency; a power of transmission; an ultra-wideband pulse shape; a communication frequency band; a communication channel; and a modulation method.

10. The communication method of claim 9, further comprising means for transmitting the at least one selected communication parameter to at least one communication device.

11. The communication method of claim 9, further comprising means for communicating using the at least one selected communication parameter.

* * * * *